(12) United States Patent
Lupescu et al.

(10) Patent No.: US 10,560,214 B2
(45) Date of Patent: Feb. 11, 2020

(54) DOWNLINK AND UPLINK COMMUNICATION PATH SWITCHING IN A TIME-DIVISION DUPLEX (TDD) DISTRIBUTED ANTENNA SYSTEM (DAS)

(71) Applicant: Corning Optical Communications LLC, Charlotte, NC (US)

(72) Inventors: Guy Lupescu, Tel Aviv (IL); Parwiz Shekalim, Netanya (IL)

(73) Assignee: Corning Optical Communications LLC, Charlotte, NC (US)

( * ) Notice: Subject to any disclaimer, the term of this patent is extended or adjusted under 35 U.S.C. 154(b) by 562 days.

(21) Appl. No.: 14/867,478

(22) Filed: Sep. 28, 2015

(65) Prior Publication Data
US 2017/0094679 A1 Mar. 30, 2017

(51) Int. Cl.
*H04J 14/08* (2006.01)
*H04L 5/14* (2006.01)
*H04L 5/18* (2006.01)

(52) U.S. Cl.
CPC ............ *H04J 14/08* (2013.01); *H04L 5/1469* (2013.01); *H04L 5/18* (2013.01)

(58) Field of Classification Search
CPC ........... H04J 14/08; H04L 5/1469; H04L 5/18
See application file for complete search history.

(56) References Cited

U.S. PATENT DOCUMENTS

| 4,365,865 A | 12/1982 | Stiles |
| 4,449,246 A | 5/1984 | Seiler et al. |
| 4,573,212 A | 2/1986 | Lipsky |

(Continued)

FOREIGN PATENT DOCUMENTS

| AU | 645192 B | 10/1992 |
| AU | 731180 B2 | 3/1998 |

(Continued)

OTHER PUBLICATIONS

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

(Continued)

*Primary Examiner* — Jael M Ulysse
(74) *Attorney, Agent, or Firm* — C. Keith Montgomery

(57) ABSTRACT

Embodiments of the disclosure relate to downlink (DL) and uplink (UL) communication path switching in a time-division duplex (TDD) distributed antenna system (DAS). In this regard, a communications control circuit is provided. The communications control circuit is configured to synchronize to DL periods and UL periods of TDD communication signal to switch a TDD communication signal between a DL communication path and a UL communication path in a DAS accordingly. The communication control circuit is configured to detect the DL periods and/or the UL periods in the TDD communication signal by sensing a power increase associated with the TDD communication signal in the DL communication path. In this manner, the TDD communication signals can be synchronously directed to the DL communication path and UL communication path without destructing and/or decoding the TDD communication signals.

27 Claims, 11 Drawing Sheets

(56) References Cited

U.S. PATENT DOCUMENTS

| | | |
|---|---|---|
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |

(56) References Cited

U.S. PATENT DOCUMENTS

| | | |
|---|---|---|
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,549,772 B1 | 4/2003 | Chavez et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |

(56) References Cited

U.S. PATENT DOCUMENTS

| | | |
|---|---|---|
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,844,182 B2 | 11/2010 | Mostert et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,165,100 B2 | 4/2012 | Sabat et al. |
| 8,213,401 B2 | 7/2012 | Fischer et al. |
| 8,223,795 B2 | 7/2012 | Cox et al. |
| 8,238,463 B1 | 8/2012 | Arslan et al. |
| 8,270,387 B2 | 9/2012 | Cannon et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,201 B1 | 4/2013 | McHann, Jr. et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |

(56) References Cited

U.S. PATENT DOCUMENTS

| | | |
|---|---|---|
| 9,621,293 B2 | 4/2017 | Hazani et al. |
| 10,003,452 B2* | 6/2018 | Cheng .................... H04L 5/16 |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0061005 A1* | 5/2002 | Lee ........................ H04B 1/44 370/342 |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0147287 A1* | 7/2004 | Nelson, Jr. ............... H01Q 3/26 455/561 |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204105 A1* | 10/2004 | Liang ................... H04B 7/0608 455/562.1 |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0059437 A1 | 3/2005 | Son et al. |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0176857 A1* | 8/2006 | Utakouji ............... H04B 7/2606 370/334 |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |

(56) References Cited

U.S. PATENT DOCUMENTS

| | | |
|---|---|---|
| 2007/0230328 A1* | 10/2007 | Saitou .................... H04L 1/22 370/210 |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1* | 11/2007 | Sabat, Jr. ............ H04B 10/1127 398/5 |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1* | 1/2008 | Charbonneau ........ H04W 16/18 455/446 |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0095195 A1* | 4/2008 | Ahmadi ................ H04L 5/0007 370/478 |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0144543 A1* | 6/2008 | Hunton .................... H04B 1/18 370/280 |
| 2008/0144612 A1* | 6/2008 | Honkasalo ............. H04L 12/66 370/370 |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1* | 9/2008 | Oren ...................... H04B 7/022 370/328 |
| 2008/0232799 A1 | 9/2008 | Kim |
| 2008/0247716 A1 | 10/2008 | Thomas |
| 2008/0253280 A1* | 10/2008 | Tang ...................... H04B 1/74 370/216 |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0180435 A1* | 7/2009 | Sarkar .................... H04L 5/14 370/330 |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1* | 11/2009 | Subasic ............. H04B 7/15578 370/315 |
| 2009/0316608 A1 | 12/2009 | Singh et al. |
| 2009/0316609 A1 | 12/2009 | Singh |
| 2009/0316611 A1* | 12/2009 | Stratford ............... H04J 3/0608 370/294 |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0041341 A1* | 2/2010 | Stratford .................. H04L 5/14 455/67.14 |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |

(56) References Cited

U.S. PATENT DOCUMENTS

| | | | |
|---|---|---|---|
| 2010/0311472 A1 | 12/2010 | Rofougaran et al. | |
| 2010/0311480 A1 | 12/2010 | Raines et al. | |
| 2010/0329161 A1 | 12/2010 | Ylanen et al. | |
| 2010/0329166 A1 | 12/2010 | Mahany et al. | |
| 2010/0329680 A1 | 12/2010 | Presi et al. | |
| 2011/0002687 A1 | 1/2011 | Sabat, Jr. et al. | |
| 2011/0007724 A1 | 1/2011 | Mahany et al. | |
| 2011/0007733 A1 | 1/2011 | Kubler et al. | |
| 2011/0008042 A1 | 1/2011 | Stewart | |
| 2011/0019999 A1 | 1/2011 | George et al. | |
| 2011/0021146 A1 | 1/2011 | Pernu | |
| 2011/0021224 A1 | 1/2011 | Koskinen et al. | |
| 2011/0026932 A1 | 2/2011 | Yeh et al. | |
| 2011/0045767 A1 | 2/2011 | Rofougaran et al. | |
| 2011/0065450 A1 | 3/2011 | Kazmi | |
| 2011/0066774 A1 | 3/2011 | Rofougaran | |
| 2011/0069668 A1 | 3/2011 | Chion et al. | |
| 2011/0071734 A1 | 3/2011 | Van Wiemeersch et al. | |
| 2011/0086614 A1 | 4/2011 | Brisebois et al. | |
| 2011/0103534 A1* | 5/2011 | Axmon | H04J 11/0069 375/371 |
| 2011/0116393 A1 | 5/2011 | Hong et al. | |
| 2011/0116572 A1 | 5/2011 | Lee et al. | |
| 2011/0122912 A1 | 5/2011 | Benjamin et al. | |
| 2011/0126071 A1 | 5/2011 | Han et al. | |
| 2011/0149879 A1 | 6/2011 | Noriega et al. | |
| 2011/0158298 A1 | 6/2011 | Djadi et al. | |
| 2011/0182217 A1* | 7/2011 | Schmid | H04B 7/155 370/293 |
| 2011/0182230 A1 | 7/2011 | Ohm et al. | |
| 2011/0194475 A1 | 8/2011 | Kim et al. | |
| 2011/0200328 A1 | 8/2011 | In De Betou et al. | |
| 2011/0201368 A1 | 8/2011 | Faccin et al. | |
| 2011/0204504 A1 | 8/2011 | Henderson et al. | |
| 2011/0206383 A1 | 8/2011 | Chien et al. | |
| 2011/0211439 A1 | 9/2011 | Manpuria et al. | |
| 2011/0215901 A1 | 9/2011 | Van Wiemeersch et al. | |
| 2011/0222415 A1 | 9/2011 | Ramamurthi et al. | |
| 2011/0222434 A1 | 9/2011 | Chen | |
| 2011/0222619 A1 | 9/2011 | Ramamurthi et al. | |
| 2011/0227795 A1 | 9/2011 | Lopez et al. | |
| 2011/0244887 A1 | 10/2011 | Dupray et al. | |
| 2011/0256878 A1 | 10/2011 | Zhu et al. | |
| 2011/0263280 A1* | 10/2011 | Guey | H04B 7/024 455/500 |
| 2011/0268033 A1 | 11/2011 | Boldi et al. | |
| 2011/0274021 A1 | 11/2011 | He et al. | |
| 2011/0281536 A1 | 11/2011 | Lee et al. | |
| 2011/0299573 A1* | 12/2011 | Sun | H04B 7/024 375/219 |
| 2012/0052892 A1 | 3/2012 | Braithwaite | |
| 2012/0134279 A1* | 5/2012 | Tamaki | H04B 7/024 370/248 |
| 2012/0177026 A1 | 7/2012 | Uyehara et al. | |
| 2013/0012195 A1 | 1/2013 | Sabat, Jr. et al. | |
| 2013/0064230 A1* | 3/2013 | Chun | H04B 7/024 370/336 |
| 2013/0070816 A1 | 3/2013 | Aoki et al. | |
| 2013/0071112 A1 | 3/2013 | Melester et al. | |
| 2013/0089332 A1 | 4/2013 | Sauer et al. | |
| 2013/0095870 A1 | 4/2013 | Phillips et al. | |
| 2013/0107763 A1* | 5/2013 | Uyehara | H04B 7/024 370/278 |
| 2013/0165067 A1 | 6/2013 | DeVries et al. | |
| 2013/0188569 A1* | 7/2013 | He | H04W 28/16 370/329 |
| 2013/0210490 A1 | 8/2013 | Fischer et al. | |
| 2013/0252651 A1 | 9/2013 | Zavadsky et al. | |
| 2013/0260705 A1 | 10/2013 | Stratford | |
| 2013/0272170 A1 | 10/2013 | Chatterjee et al. | |
| 2014/0016583 A1 | 1/2014 | Smith | |
| 2014/0140225 A1 | 5/2014 | Wala | |
| 2014/0146797 A1 | 5/2014 | Zavadsky et al. | |
| 2014/0146905 A1 | 5/2014 | Zavadsky et al. | |
| 2014/0146906 A1 | 5/2014 | Zavadsky et al. | |
| 2014/0219140 A1 | 8/2014 | Uyehara et al. | |
| 2014/0269450 A1* | 9/2014 | Faurie | H04B 7/2656 370/280 |
| 2014/0269453 A1* | 9/2014 | Papasakellariou | H04L 1/1861 370/280 |
| 2014/0334353 A1* | 11/2014 | Wei | H04W 72/1263 370/280 |
| 2014/0341051 A1* | 11/2014 | Gaal | H04W 24/10 370/252 |
| 2014/0369290 A1* | 12/2014 | Yang | H04L 1/1861 370/329 |
| 2015/0131632 A1 | 5/2015 | Hazani et al. | |
| 2015/0163815 A1* | 6/2015 | Lei | H04W 16/10 370/280 |
| 2015/0189574 A1* | 7/2015 | Ng | H04W 24/08 370/252 |
| 2015/0215107 A1* | 7/2015 | Siomina | H04L 5/16 370/281 |
| 2015/0249513 A1* | 9/2015 | Schwab | H04L 5/1469 370/278 |
| 2015/0249965 A1* | 9/2015 | Dussmann | H03G 3/3042 455/501 |
| 2015/0250017 A1* | 9/2015 | Ingale | H04B 7/2615 370/280 |
| 2016/0020891 A1* | 1/2016 | Jung | H04L 5/0064 370/280 |
| 2016/0088623 A1 | 3/2016 | Ben-Shlomo et al. | |
| 2016/0173265 A1 | 6/2016 | Dadoun et al. | |
| 2017/0019882 A1* | 1/2017 | Nimbalker | H04W 72/042 |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| CN | 201869169 U | 6/2011 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1942598 A2 | 7/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |

(56) References Cited

FOREIGN PATENT DOCUMENTS

| | | | |
|---|---|---|---|
| JP | 11068675 | A | 3/1999 |
| JP | 2000152300 | A | 5/2000 |
| JP | 2000341744 | A | 12/2000 |
| JP | 2002264617 | A | 9/2002 |
| JP | 2002353813 | A | 12/2002 |
| JP | 2003148653 | A | 5/2003 |
| JP | 2003172827 | A | 6/2003 |
| JP | 2004172734 | A | 6/2004 |
| JP | 2004245963 | A | 9/2004 |
| JP | 2004247090 | A | 9/2004 |
| JP | 2004264901 | A | 9/2004 |
| JP | 2004265624 | A | 9/2004 |
| JP | 2004317737 | A | 11/2004 |
| JP | 2004349184 | A | 12/2004 |
| JP | 2005018175 | A | 1/2005 |
| JP | 2005087135 | A | 4/2005 |
| JP | 2005134125 | A | 5/2005 |
| JP | 2007228603 | A | 9/2007 |
| JP | 2008172597 | A | 7/2008 |
| KR | 20010055088 | A | 7/2001 |
| WO | 9603823 | A1 | 2/1996 |
| WO | 9810600 | A1 | 3/1998 |
| WO | 00042721 | A1 | 7/2000 |
| WO | 0072475 | A1 | 11/2000 |
| WO | 0178434 | A1 | 10/2001 |
| WO | 0184760 | A1 | 11/2001 |
| WO | 0221183 | A1 | 3/2002 |
| WO | 0230141 | A1 | 4/2002 |
| WO | 02102102 | A1 | 12/2002 |
| WO | 03024027 | A1 | 3/2003 |
| WO | 03098175 | A1 | 11/2003 |
| WO | 2004030154 | A2 | 4/2004 |
| WO | 2004047472 | A1 | 6/2004 |
| WO | 2004056019 | A1 | 7/2004 |
| WO | 2004059934 | A1 | 7/2004 |
| WO | 2004086795 | A2 | 10/2004 |
| WO | 2004093471 | A2 | 10/2004 |
| WO | 2005062505 | A1 | 7/2005 |
| WO | 2005069203 | A2 | 7/2005 |
| WO | 2005073897 | A1 | 8/2005 |
| WO | 2005079386 | A2 | 9/2005 |
| WO | 2005101701 | A2 | 10/2005 |
| WO | 2005111959 | A2 | 11/2005 |
| WO | 2006011778 | A1 | 2/2006 |
| WO | 2006018592 | A1 | 2/2006 |
| WO | 2006019392 | A1 | 2/2006 |
| WO | 2006039941 | A1 | 4/2006 |
| WO | 2006051262 | A1 | 5/2006 |
| WO | 2006060754 | A2 | 6/2006 |
| WO | 2006077569 | A1 | 7/2006 |
| WO | 2006105185 | A2 | 10/2006 |
| WO | 2006133609 | A1 | 12/2006 |
| WO | 2006136811 | A1 | 12/2006 |
| WO | 2007048427 | A1 | 5/2007 |
| WO | 2007077451 | A1 | 7/2007 |
| WO | 2007088561 | A1 | 8/2007 |
| WO | 2007091026 | A1 | 8/2007 |
| WO | 2008008249 | A2 | 1/2008 |
| WO | 2008027213 | A2 | 3/2008 |
| WO | 2008033298 | A2 | 3/2008 |
| WO | 2008039830 | A2 | 4/2008 |
| WO | 2008076248 | A1 | 6/2008 |
| WO | 2008116014 | A2 | 9/2008 |
| WO | 2009012614 | A1 | 1/2009 |
| WO | 2006046088 | A1 | 5/2009 |
| WO | 2010090999 | A1 | 8/2010 |
| WO | 2010132739 | A1 | 11/2010 |
| WO | 2011023592 | A1 | 3/2011 |
| WO | 2011100095 | A1 | 8/2011 |
| WO | 2011139939 | A1 | 11/2011 |
| WO | 2012148938 | A1 | 11/2012 |
| WO | 2012148940 | A1 | 11/2012 |
| WO | 2012151650 | A1 | 11/2012 |
| WO | 2013122915 | A1 | 8/2013 |
| WO | 2015029021 | A1 | 3/2015 |

OTHER PUBLICATIONS

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.

Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.

Author Unknown, RFID Technology Overview, Date Unknown, 11 pages.

Opatic, D., "Radio over Fiber Technology for Wireless Access," Ericsson, Oct. 17, 2009, 6 pages.

Paulraj, A.J., et al., "An Overview of MIMO Communications—A Key to Gigabit Wireless," Proceedings of the IEEE, Feb. 2004, vol. 92, No. 2, 34 pages.

(56) References Cited

OTHER PUBLICATIONS

Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
International Preliminary Report on Patentability for PCT/IL2013/050671 dated Feb. 10, 2015, 6 pages.
International Search Report for PCT/IL2013/050671 dated Jan. 30, 2014, 3 pages.
Author Unknown, "Technical Specification Group Radio Access Network; Evolved Universal Terrestrial Radio Access (E-UTRA); Physical channels and modulation (Release 12)," Technical Specification 36.211, Version 12.7.0, 3GPP Organizational Partners, Sep. 2015, 136 pages.
Non-final Office Action for U.S. Appl. No. 14/599,710, dated Jun. 20, 2016, 14 pages.
International Search Report and Written Opinion for PCT/IL2014/050526, dated Sep. 2, 2014, 12 pages.
Non-Final Office Action for U.S. Appl. No. 14/962,338, dated May 30, 2017, 24 pages.
Non-Final Office Action and Examiner-Initiated Interview Summary for U.S. Appl. No. 15/447,580, dated Aug. 2, 2017, 10 pages.
International Search Report for PCT/IL2014/050758, dated Nov. 19, 2014, 4 pages.
International Preliminary Report on Patentability for PCT/IL2014/050758, dated Mar. 10, 2016, 8 pages.
Final Office Action for U.S. Appl. No. 14/962,338, dated Oct. 16, 2017, 24 pages.
Non-Final Office Action for U.S. Appl. No. 15/049,663, dated Aug. 7, 2017, 20 pages.
Author Unknown, "Fiber Optic Distributed Antenna System," Installation and Users Guide, ERAU Version 1.5, May 2002, Andrews Corporation, 53 pages.
Notice of Allowance and Examiner-Initiated Interview Summary for U.S. Appl. No. 14/599,710, dated Jan. 23, 2017, 9 pages.
Notice of Allowance for U.S. Appl. No. 14/962,338, dated Jan. 25, 2018, 8 pages.
Final Office Action for U.S. Appl. No. 15/049,663, dated Feb. 9, 2018, 22 pages.
Notice of Allowance for U.S. Appl. No. 15/447,580, dated Jan. 22, 2018, 9 pages.
Advisory Action for U.S. Appl. No. 15/049,663, dated May 14, 2018, 3 pages.
Examiner's Answer to the Appeal Brief for U.S. Appl. No. 15/049,663, dated Nov. 27, 2018, 10 pages.

* cited by examiner

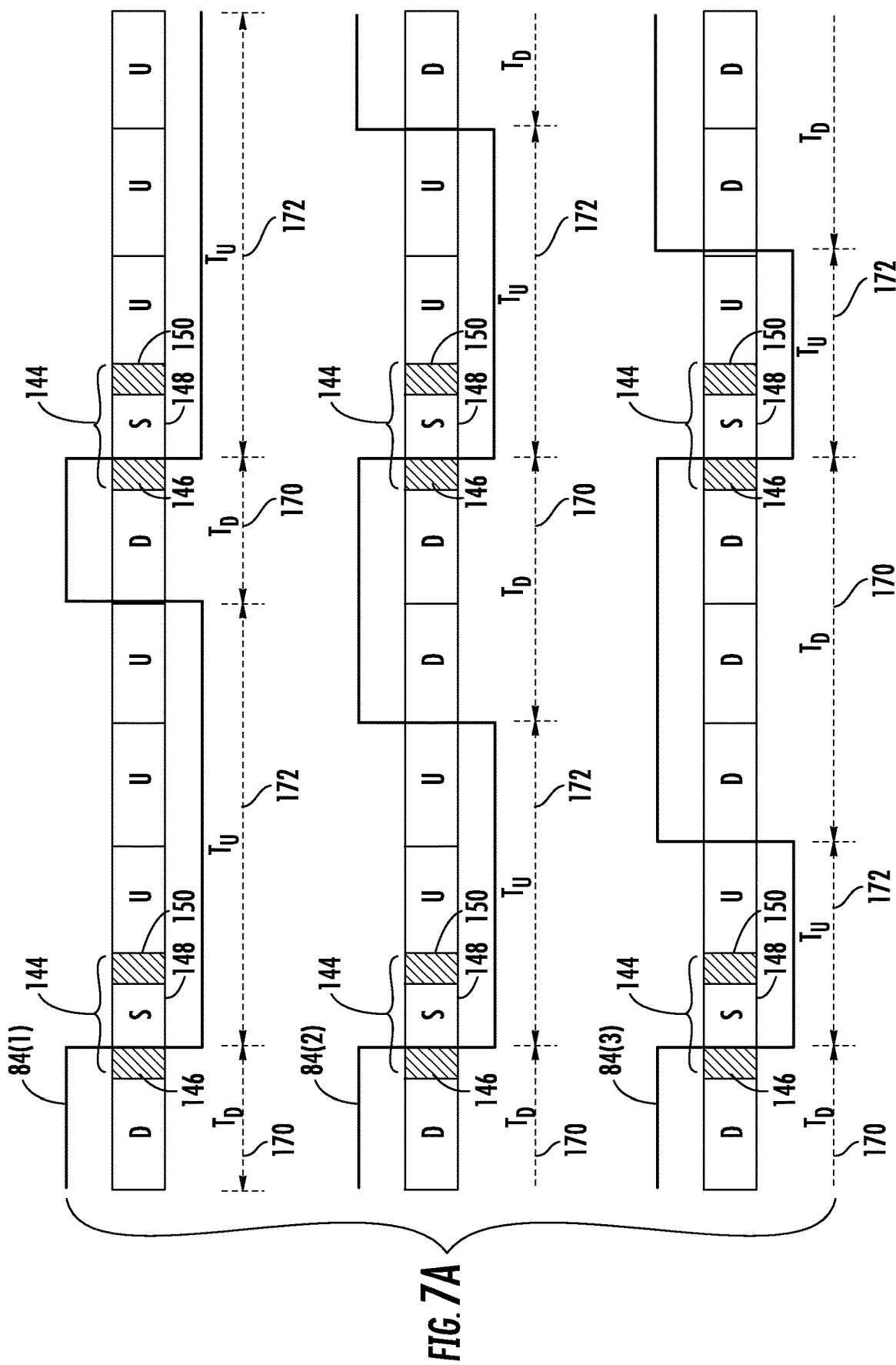

DOWNLINK AND UPLINK COMMUNICATION PATH SWITCHING IN A TIME-DIVISION DUPLEX (TDD) DISTRIBUTED ANTENNA SYSTEM (DAS)

BACKGROUND

The disclosure relates generally to a distributed antenna system (DAS), and more particularly, to communicating time-division duplex (TDD) communication signals in a DAS.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communication devices may not otherwise be able to effectively receive radio frequency (RF) signals from a source.

DASs are especially effective in extending indoor coverage for high-speed and high-throughput wireless broadband technologies like long-term evolution (LTE). LTE is a high-speed wireless technology developed by the third generation partnership project (3GPP). LTE is defined to support both the paired spectrum for frequency-division duplex (FDD) and the unpaired spectrum for TDD.

In LTE TDD, communication signals are communicated in repetitively alternating downlink (DL) and uplink (UL) periods that occupy the same frequency band. In this regard, DL communications can only take place during DL periods and UL communications can only take place during UL periods. Unlike LTE FDD, in which DL and UL capacities are symmetric, LTE TDD allows DL and UL capacities to be asymmetrically configured based predefined TDD configurations. For example, 3GPP has defined seven different TDD configurations for partitioning TDD DL and UL periods.

No admission is made that any reference cited herein constitutes prior art. Applicant expressly reserves the right to challenge the accuracy and pertinency of any cited documents.

SUMMARY

Embodiments of the disclosure relate to downlink (DL) and uplink (UL) communication path switching in a time-division duplex (TDD) distributed antenna system (DAS). In this regard, a TDD communication signal is communicated between a central unit and remote units in a DAS. The TDD communication signal contains uplink communications information and downlink communications information that is communicated in alternating DL periods and UL periods. To synchronously switch the TDD communication signal between a DL communication path and an UL communication path in the DAS according to the alternating DL periods and UL periods, in aspects disclosed herein, a communications control circuit is provided. The communications control circuit is configured to synchronize to the DL periods and the UL periods of TDD communication signal to switch the TDD communication signal between the DL communication path and the UL communication path according to the DL periods and the UL periods. The communication control circuit is configured to detect the DL periods and/or the UL periods in the TDD communication signal to synchronize to the DL periods and/or the UL periods by sensing a power increase associated with the TDD communication signal in the DL communication path. In this manner, the TDD communication signals can be synchronously directed to the DL communication path and the UL communication path without destructing and/or decoding the TDD communication signals.

One embodiment of the disclosure relates to a DAS configured to support TDD communications. The DAS comprises a central unit communicatively coupled to a plurality of remote units over at least one communications medium to communicate a TDD communication signal in a plurality of DL periods and a plurality of UL periods configured according to a predefined TDD configuration of a predetermined TDD communications protocol. The central unit comprises at least one communication circuit. The at least one communication circuit is configured to transmit the TDD communication signal in a DL communication path of the central unit to the plurality of remote units in response to a DL period indicator indicating a DL period among the plurality of DL periods. The at least one communication circuit is also configured to receive the TDD communication signal in a UL communication path of the central unit from the plurality of remote units in response to a UL period indicator indicating a UL period among the plurality of UL periods. The DAS also comprises a communication control circuit. The communication control circuit is configured to determine a plurality of DL switching times respectively for the plurality of DL periods and a plurality of UL switching times respectively for the plurality of UL periods based on the predefined TDD configuration. The communication control circuit is also configured to detect a respective start time of at least one DL period among the plurality of DL periods by sensing that a power level associated with the TDD communication signal increases above a predetermined DL signal power threshold. The communication control circuit is also configured to synchronize at least one DL switching time among the plurality of DL switching times with the respective start time of the at least one detected DL period. The communication control circuit is also configured to generate the DL period indicator to indicate the DL period among the plurality of DL periods at each of the plurality of DL switching times. The communication control circuit is also configured to generate the UL period indicator to indicate the UL period among the plurality of UL periods at each of the plurality of UL switching times.

Another embodiment of the disclosure relates to a method for communicating TDD communication signals in a DAS. The method comprises receiving a TDD communication signal in a plurality of DL periods and a plurality of UL periods configured according to a predefined TDD configuration of a predetermined TDD communications protocol. The method also comprises determining a plurality of DL switching times respectively for the plurality of DL periods and a plurality of UL switching times respectively for the plurality of UL periods. The method also comprises detecting at least one start time of at least one DL period among the plurality of DL periods by sensing that a power level associated with the TDD communication signal increases above a predetermined DL signal power threshold. The method also comprises synchronizing at least one DL switching time among the plurality of DL switching times with the at least one start time of the at least one detected DL period. The method also comprises generating a DL period indicator to indicate a DL period among the plurality of DL periods at each of the plurality of DL switching times. The method also comprises distributing the TDD communication signal in a DL communication path in response to the DL period. The method also comprises generating a UL period indicator to indicate a UL period among the plurality of UL periods at each of the plurality of UL switching times. The method also comprises receiving the TDD communication signal in a UL communication path in response to the UL period indicator indicating the UL period among the plurality of UL periods.

Another embodiment of the disclosure relates to a central unit in a DAS. The central unit comprises at least one communication circuit. The at least one communication circuit is configured to receive a TDD communication signal from a communication signal source in a plurality of DL periods and a plurality of UL periods configured according to a predefined TDD configuration of a predetermined TDD communications protocol. The at least one communication circuit is configured to transmit the TDD communication signal in a DL communication path of the central unit in response to a DL period indicator indicating a DL period among the plurality of DL periods. The at least one communication circuit is also configured to receive the TDD communication signal in a UL communication path of the central unit in response to a UL period indicator indicating a UL period among the plurality of UL periods. The central unit also comprises a communication control circuit. The communication control circuit is configured to determine a plurality of DL switching times respectively for the plurality of DL periods and a plurality of UL switching times respectively for the plurality of UL periods based on the predefined TDD configuration. The communication control circuit is also configured to detect a respective start time of at least one DL period among the plurality of DL periods by sensing that a power level associated with the TDD communication signal increases above a predetermined DL signal power threshold. The communication control circuit is also configured to synchronize at least one DL switching time among the plurality of DL switching times with the respective start time of the at least one detected DL period. The communication control circuit is also configured to generate the DL period indicator to indicate the DL period among the plurality of DL periods at each of the plurality of DL switching times. The communication control circuit is also configured to generate the UL period indicator to indicate the UL period among the plurality of UL periods at each of the plurality of UL switching times.

Another embodiment of the disclosure relates to a remote unit in a DAS. The remote unit comprises a communication circuit. The communication circuit is configured to receive a TDD communication signal from a central unit in a plurality of DL periods and a plurality of UL periods configured according to a predefined TDD configuration of a predetermined TDD communications protocol. The communication circuit is also configured to transmit the TDD communication signal in a DL communication path of the remote unit in response to a DL period indicator indicating a DL period among the plurality of DL periods. The communication circuit is also configured to receive the TDD communication signal in a UL communication path of the remote unit in response to a UL period indicator indicating a UL period among the plurality of UL periods. The remote unit also comprises a communication control circuit. The communication control circuit is configured to determine a plurality of DL switching times respectively for the plurality of DL periods and a plurality of UL switching times respectively for the plurality of UL periods based on the predefined TDD configuration. The communication control circuit is also configured to detect a respective start time of at least one DL period among the plurality of DL periods by sensing that a power level associated with the TDD communication signal increases above a predetermined DL signal power threshold. The communication control circuit is also configured to synchronize at least one DL switching time among the plurality of DL switching times with the respective start time of the at least one detected DL period. The communication control circuit is also configured to generate the DL period indicator to indicate the DL period among the plurality of DL periods at each of the plurality of DL switching times. The communication control circuit is also configured to generate the UL period indicator to indicate the UL period among the plurality of UL periods at each of the plurality of UL switching times.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 7A is a schematic diagram providing an exemplary illustration of determining respective switching schedules based on 3GPP TS 36.211 uplink-downlink configurations zero (0), one (1), and two (2);

DETAILED DESCRIPTION

Embodiments of the disclosure relate to downlink (DL) and uplink (UL) communication path switching in a time-division duplex (TDD) distributed antenna system (DAS). In this regard, a TDD communication signal is communicated between a central unit and remote units in a DAS. The TDD communication signal contains uplink communications information and downlink communications information that is communicated in alternating DL periods and UL periods. To synchronously switch the TDD communication signal between a DL communication path and an UL communication path in the DAS according to the alternating DL periods and UL periods, in aspects disclosed herein, a communications control circuit is provided. The communications control circuit is configured to synchronize to the DL periods and the UL periods of TDD communication signal to switch the TDD communication signal between the DL communication path and the UL communication path according to the DL periods and the UL periods. The communication control circuit is configured to detect the DL periods and/or the UL periods in the TDD communication signal to synchronize to the DL periods and/or the UL periods by sensing a power increase associated with the TDD communication signal in the DL communication path. In this manner, the TDD communication signals can be synchronously directed to the DL communication path and the UL communication path without destructing and/or decoding the TDD communication signals.

Figure 1:
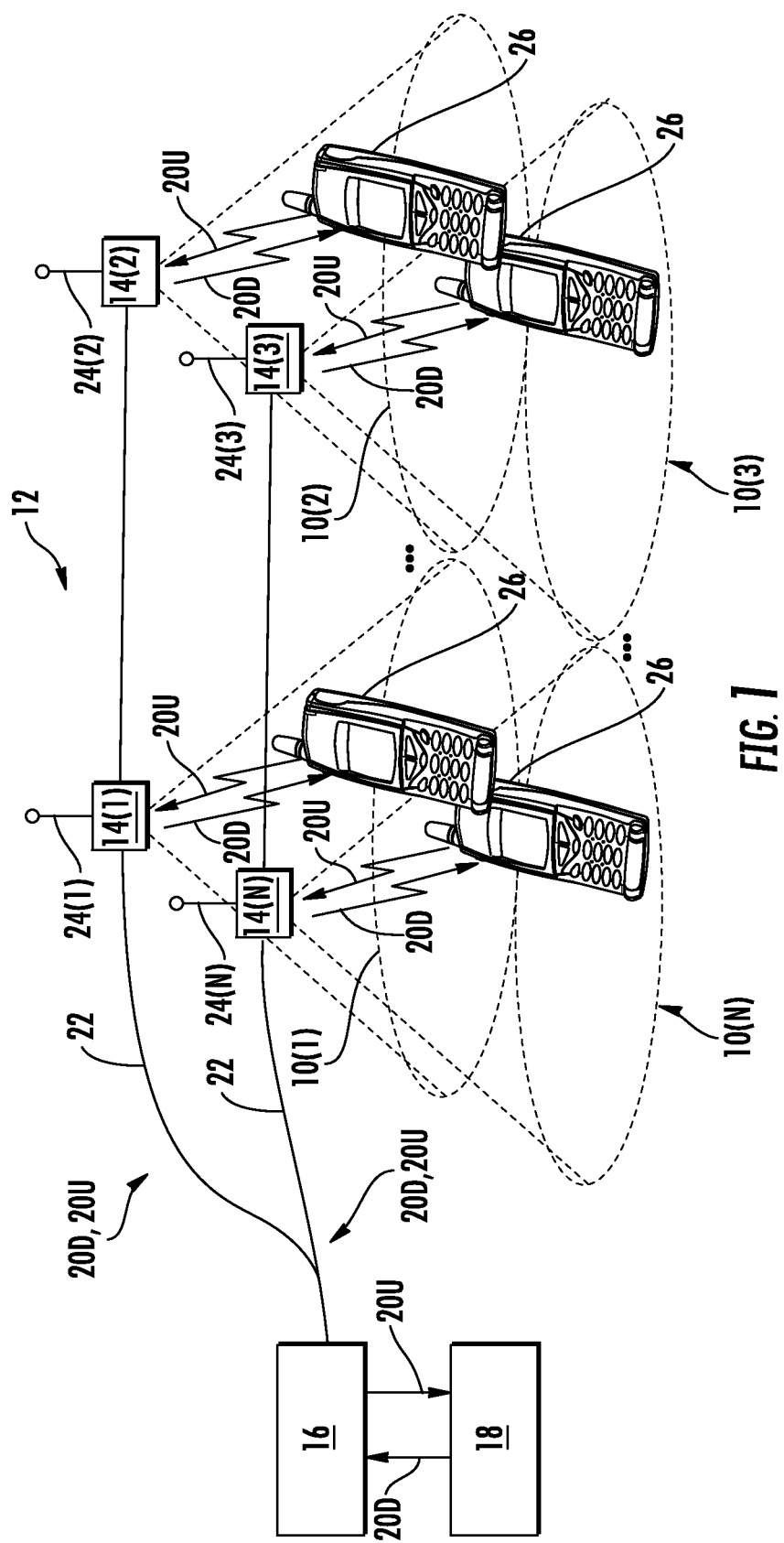
FIG. 1 is a schematic diagram of an exemplary distributed antenna system (DAS)
Figure 2:
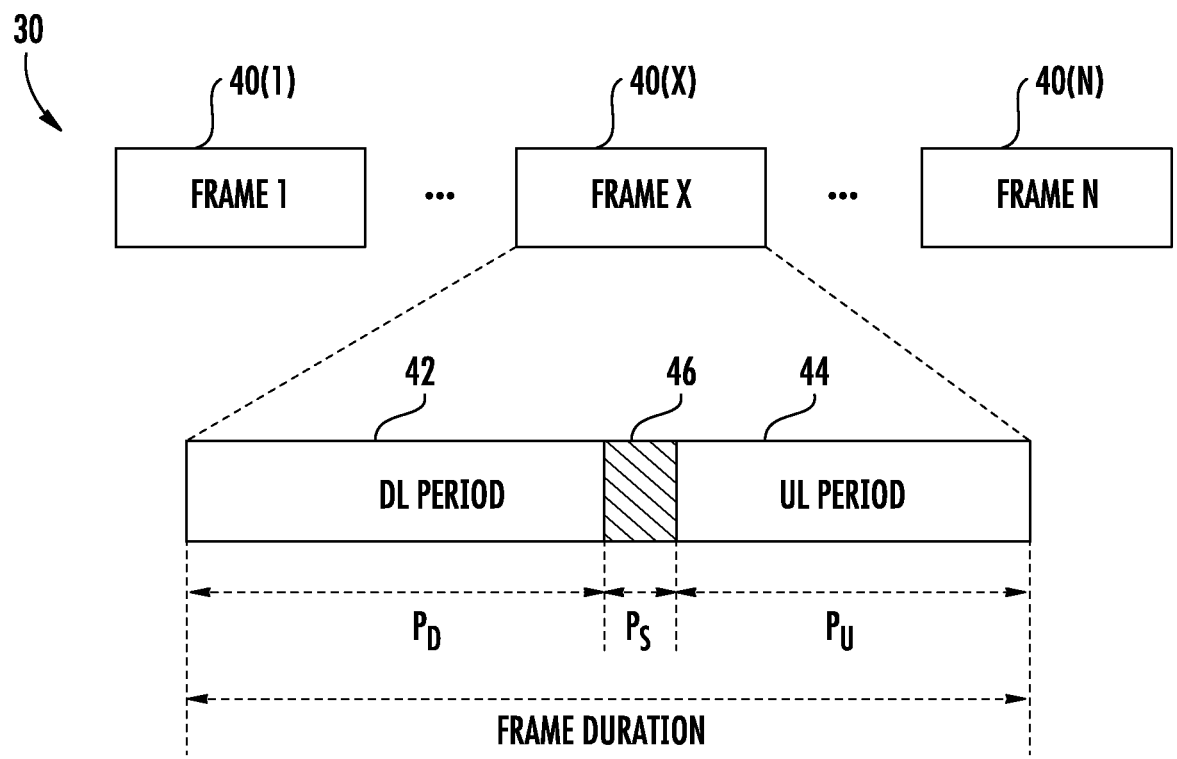
FIG. 2 is a schematic diagram of an exemplary time-division duplex (TDD) scheme and an exemplary communication circuit configured to alternate between a downlink (DL) path and an uplink (UL) path based on the TDD scheme.
Figure 2:
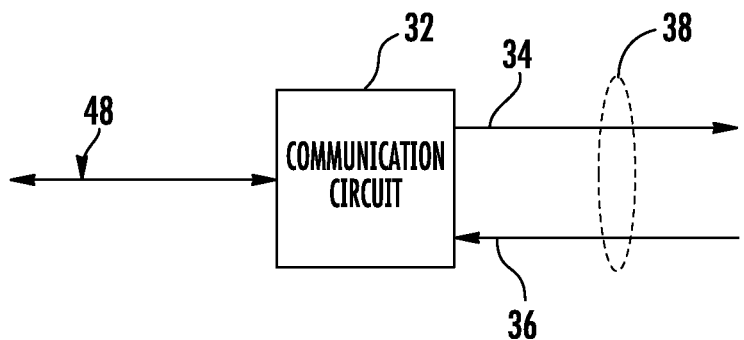
Figure 3:
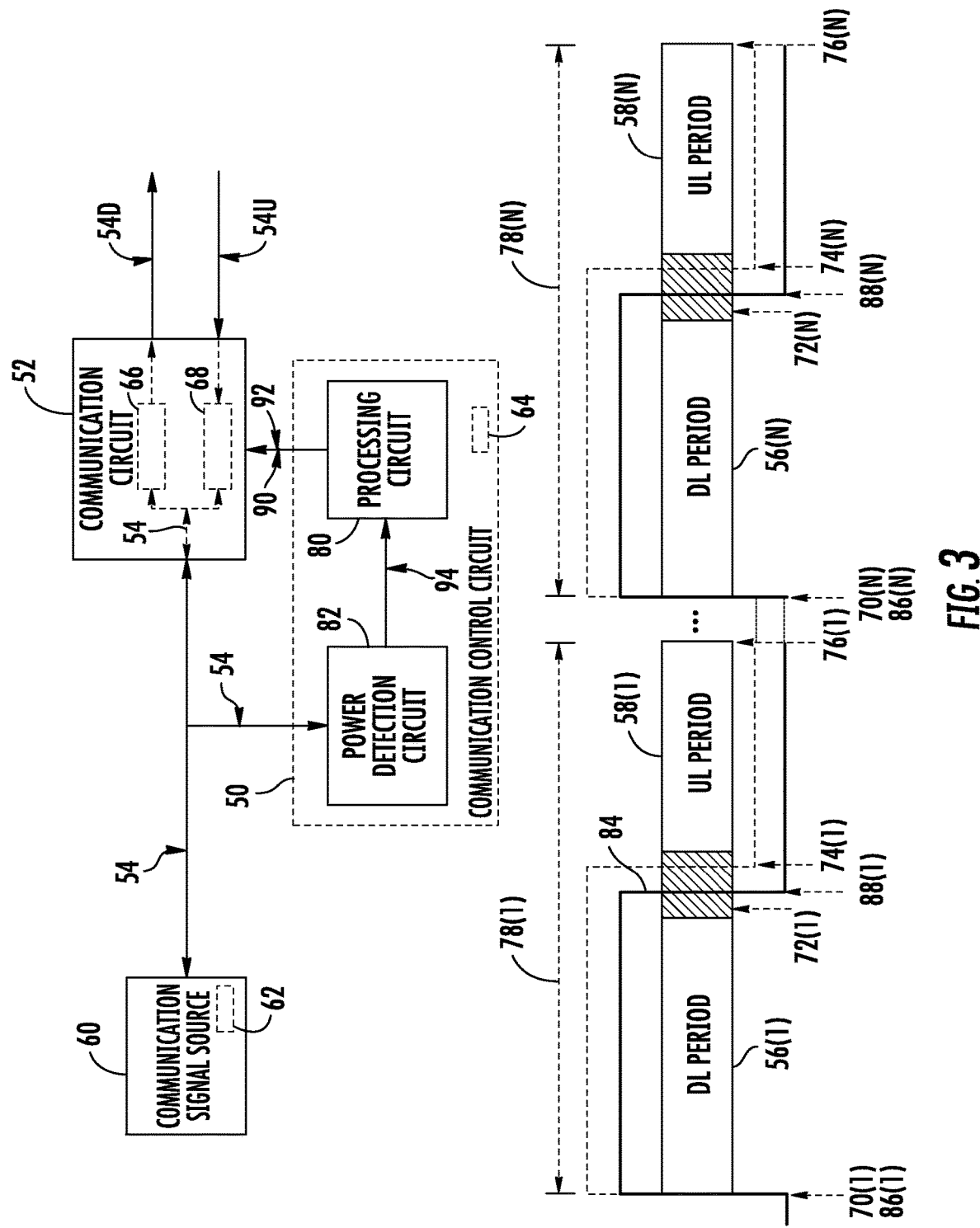
FIG. 3 is a schematic diagram of an exemplary communication control circuit configured to enable a communication circuit to synchronously communicate a TDD communication signal in a plurality of DL periods and a plurality of UL periods associated with the TDD communication signal.

Before discussing examples of communicating TDD communication signals in a DAS starting at FIG. 3, a discussion of an exemplary DAS that employs a communications medium to support wireless communications services, including TDD-based communications services, to a plurality of remote units is first provided with reference to FIG. 1. An overview of typical TDD frame structure is then provided with reference to FIG. 2. The discussion of specific exemplary aspects of communicating TDD communication signals in a DAS starts at FIG. 3.

In this regard, FIG. 1 illustrates distribution of communications services to remote coverage areas 10(1)-10(N) of a DAS 12, wherein 'N' is the number of remote coverage areas. These communications services can include cellular services, wireless services, such as radio frequency identification (RFID) tracking, Wireless Fidelity (Wi-Fi), local area network (LAN), and wireless LAN (WLAN), world-wide interoperability for microwave access (WiMAX), wide-band code-division multiple access (WCDMA), long-term evolution (LTE), and combinations thereof, as examples. The remote coverage areas 10(1)-10(N) may be remotely located. In this regard, the remote coverage areas 10(1)-10(N) are created by and centered on remote units 14(1)-14(N) (e.g., remote antenna units) connected to a central unit 16 (e.g., a head-end controller, a head-end unit, or a head-end equipment). The central unit 16 may be communicatively coupled to a signal source 18, for example, a base transceiver station (BTS) or a baseband unit (BBU). In this regard, the central unit 16 receives downlink communications signals 20D from the signal source 18 to be distributed to the remote units 14(1)-14(N). The remote units 14(1)-14(N) are configured to receive the downlink communications signals 20D from the central unit 16 over a communications medium 22 to be distributed to the respective remote coverage areas 10(1)-10(N) of the remote units 14(1)-14(N). In a non-limiting example, the communications medium 22 may be a wired communications medium, a wireless communications medium, or an optical fiber-based communications medium. Each of the remote units 14(1)-14(N) may include an RF transmitter/receiver (not shown) and a respective antenna 24(1)-24(N) operably connected to the RF transmitter/receiver to wirelessly distribute the communications services to client devices 26 within the respective remote coverage areas 10(1)-10(N). The remote units 14(1)-14(N) are also configured to receive uplink communications signals 20U from the client devices 26 in the respective remote coverage areas 10(1)-10(N) to be distributed to the signal source 18. The size of each of the remote coverage areas 10(1)-10(N) is determined by the amount of RF power transmitted by the respective remote units 14(1)-14(N), receiver sensitivity, antenna gain, and RF environment, as well as by RF transmitter/receiver sensitivity of the client devices 26. The client devices 26 usually have a fixed maximum RF receiver sensitivity, so that the above-mentioned properties of the remote units 14(1)-14(N) mainly determine the size of the respective remote coverage areas 10(1)-10(N).

With reference to FIG. 1, in one non-limiting example, the downlink communications signals 20D and the uplink communications signals 20U may be communicated in the DAS 12 based on a TDD scheme. In this regard, FIG. 2 is a schematic diagram of an exemplary TDD scheme 30 and an exemplary communication circuit 32 configured to alternate between a downlink (DL) communication path 34 and an uplink (UL) communication path 36 based on the TDD scheme 30. Elements of FIG. 1 are referenced in connection with FIG. 2 and will not be re-described herein.

With reference to FIG. 2, the TDD scheme 30 refers to using a duplex communication link 38, which may be the communications medium 22 of FIG. 1, for example, to support DL communication on the DL communication path 34 and UL communication on the UL communication path 36 in the same frequency band. To avoid interference, the DL communication and the UL communication are scheduled based on repetitively alternating DL periods and UL periods, respectively. In other words, the DL communication and the UL communication take place in the duplex communication link 38 at different times.

Like many other communication systems, the DL communication and the UL communication are provided in a plurality of frames 40(1)-40(N). Each of the plurality of frames 40(1)-40(N), for example frame 40(X), comprises at least one DL period 42 and at least one UL period 44. In this regard, the DL communication and the UL communication are enabled during the DL period 42 and the UL period 44, respectively. A switch period 46 is typically provided between the DL period 42 and the UL period 44 to accommodate for propagation delays associated with the DL communication. For example, the propagation delay may be associated with the downlink communications signals 20D (not shown) that propagate from the respective remote units 14(1)-14(N) (not shown) to the client devices 26 (not shown).

One of the advantages of the TDD scheme 30 is that the DL period 42 and the UL period 44 may be configured flexibly based on bandwidth requirements for the DL communication and the UL communication. For example, if more bandwidth is required for DL communication, the DL period 42 may be configured to be longer than the UL period 44. In contrast, if more bandwidth is required for UL communication, the UL period 44 may be configured to be longer than the DL period 42. In this regard, the DL period 42 and the UL period 44 may be configured symmetrically or asymmetrically based on the bandwidth requirements for the DL communication and the UL communication. Typically, the TDD scheme 30 predefines a number of TDD configurations for partitioning the DL period 42 and the UL period 44 in each of the plurality of frames 40(1)-40(N). For example, in an LTE TDD system, there are seven predefined TDD configurations. More details regarding TDD configurations are provided later in reference with FIG. 6.

With continuing reference to FIG. 2, the communication circuit 32, which may be provided in the central unit 16 (not shown) and the remote units 14(1)-14(N) (not shown), is configured to receive a TDD communication signal 48 which may originate from the signal source 18 (not shown). The communication circuit 32 is configured to alternate repetitively between the DL communication path 34 and the UL communication path 36 according to the DL period 42 and the UL period 44 in the plurality of frames 40(1)-40(N).

Because the TDD communication signal 48 originates from the signal source 18, the DL period 42 and the UL period 44 in each of the plurality of frames 40(1)-40(N) are scheduled by the signal source 18 based on a system clock (not shown) that is unknown to the communication circuit 32. However, the communication circuit 32 must switch between the DL communication path 34 and the UL communication path 36 according to the DL period 42 and the UL period 44 in the plurality of frames 40(1)-40(N). Hence, it is desirable for the communication circuit 32 to detect and synchronize with the DL period 42 and the UL period 44 in each of the plurality of frames 40(1)-40(N) without decoding and/or destructing the TDD communication signal 48.

In this regard, FIG. 3 is a schematic diagram of an exemplary communication control circuit 50 configured to enable a communication circuit 52 to synchronously communicate a TDD communication signal 54 in a plurality of DL periods 56(1)-56(N) and a plurality of UL periods 58(1)-58(N) associated with the TDD communication signal 54.

With reference to FIG. 3, in a non-limiting example, the TDD communication signal 54 may be provided by a communication signal source 60 (e.g., a base transceiver station (BTS)) based on a predetermined TDD communications protocol, which may include a LTE TDD communications protocol defined by the third generation partnership project (3GPP). The communication signal source 60 defines the plurality of DL periods 56(1)-56(N) and the plurality of UL periods 58(1)-58(N) according to a predefined TDD configuration of the predetermined TDD communications protocol. The communication signal source 60 utilizes a system clock 62 to determine timings of the plurality of DL periods 56(1)-56(N) and the plurality of UL periods 58(1)-58(N). The communication control circuit 50 and the communication circuit 52, on the other hand, operate based on an internal clock 64 that is unsynchronized with the system clock 62 used by the communication signal source 60.

The communication circuit 52 is configured to distribute the TDD communication signal 54 as a DL communication signal 54D in a DL communication path 66 during the plurality of DL periods 56(1)-56(N). The communication circuit 52 is configured to receive the TDD communication signal 54 as a UL communication signal 54U in a UL communication path 68 during the plurality of UL periods 58(1)-58(N). The plurality of DL periods 56(1)-56(N) is configured to start at a plurality of DL start times 70(1)-70(N) and end at a plurality of DL end times 72(1)-72(N), respectively. The plurality of UL periods 58(1)-58(N) is configured to start at a plurality of UL start times 74(1)-74(N) and end at a plurality of UL end times 76(1)-76(N), respectively. Like in the TDD scheme 30 of FIG. 2, the plurality of DL periods 56(1)-56(N) and the plurality of UL periods 58(1)-58(N) are provided in a plurality of frames 78(1)-78(N), respectively.

With continuing reference to FIG. 3, the communication control circuit 50 comprises a processing circuit 80 and a power detection circuit 82. The processing circuit 80 is configured to determine a switching schedule 84 based on the predefined TDD configuration of the predetermined TDD communications protocol. In one non-limiting example, the predefined TDD configuration may be preprogrammed in the communication control circuit 50 or provided to the communication control circuit 50 by the communication signal source 60 along with the TDD communication signal 54. Once the predefined TDD configuration is determined, the processing circuit 80 can calculate a plurality of DL switching times 86(1)-86(N) and a plurality of UL switching times 88(1)-88(N) for the switching schedule 84 based on the predefined TDD configuration. Subsequently, the processing circuit 80 can generate a DL period indicator 90 at each of the plurality of DL switching times 86(1)-86(N) and a UL period indicator 92 at each of the plurality of UL switching times 88(1)-88(N). More specific examples of determining the switching schedule 84 based on the predefined TDD configuration are provided later in references to FIGS. 7A-7C.

With continuing reference to FIG. 3, the communication circuit 52 switches to the DL communication path 66 to distribute the DL communication signal 54D in response to receiving the DL period indicator 90. The communication circuit 52 switches to the UL communication path 68 to receive the UL communication signal 54U in response to receiving the UL period indicator 92.

As previously stated, the processing circuit 80 is able to calculate the plurality of DL switching times 86(1)-86(N) and the plurality of UL switching times 88(1)-88(N) based on the predefined TDD configuration. To ensure that the communication circuit 52 distributes the DL communication signal 54D in one of the plurality of DL periods 56(1)-56(N) and receives the UL communication signal 54U in one of the plurality of UL periods 58(1)-58(N), the processing circuit 80 must correlate the plurality of DL switching times 86(1)-86(N) respectively with the plurality of DL periods 56(1)-56(N) and correlate the plurality of UL switching times 88(1)-88(N) respectively with the plurality of UL periods 58(1)-58(N). In other words, the processing circuit 80 must make sure that the communication circuit 52 switches to the DL communication path 66 no later than each of the DL start times 70(1)-70(N) and switches to the UL communication path 68 no later than each of the UL start times 74(1)-74(N).

However, the processing circuit 80 determines the switching schedule 84 based on the internal clock 64 that is asynchronous from the system clock 62 which determines the timings of the plurality of DL periods 56(1)-56(N) and the plurality of UL periods 58(1)-58(N). Therefore, the communication control circuit 50 must be able to detect at least one of the plurality of DL start times 70(1)-70(N) to help correlate the plurality of DL switching times 86(1)-86(N) with the plurality of DL periods 56(1)-56(N) and correlate the plurality of UL switching times 88(1)-88(N) with the plurality of UL periods 58(1)-58(N).

In this regard, the power detection circuit 82 is configured to detect a respective start time of at least one DL period among the plurality of DL periods 56(1)-56(N) by sensing that power level associated with the TDD communication signal 54 increases above a predetermined DL signal power threshold. Typically, the TDD communication signal 54 distributed during the plurality of DL periods 56(1)-56(N) is associated with a higher power level than the TDD communication signal 54 received during the plurality of UL periods 58(1)-58(N). Accordingly, the power level associated with the TDD communication signal 54 will rise at each of the plurality of DL start times 70(1)-70(N) and fall at each of the plurality of DL end times 72(1)-72(N). As such, by measuring the power level associated with the TDD communication signal 54 continuously, the power detection circuit 82 is able to detect at least one power rise time (not shown) at which the measured power level becomes higher than the predetermined DL signal power threshold after a period (no-DL-signal period) in which the measured power level is lower than the predetermined DL signal power threshold. In a non-limiting example, the measured power level in the no-DL-signal period is associated with the TDD communication signal 54 received during the plurality of UL periods 58(1)-58(N). The at least one power rise time can then be considered one of the plurality of DL start times 70(1)-70(N). As such, the processing circuit 80 can synchronize the plurality of DL switching times 86(1)-86(N) to the plurality of DL start times 70(1)-70(N), respectively. In a non-limiting example, the power detection circuit 82 may provide an indication 94 to the processing circuit 80 when the power rise time is detected.

With continuing reference to FIG. 3, theoretically, since the plurality of DL periods 56(1)-56(N) and the plurality of UL periods 58(1)-58(N) are known based on the predefined TDD configuration, the communication control circuit 50 only needs to detect the power rise time once and keep the switching schedule 84 in sync with the plurality of DL periods 56(1)-56(N) and the plurality of UL periods 58(1)-58(N) thereafter based on the internal clock 64. However, the system clock 62 and the internal clock 64 can both drift over time. This is especially true when the system clock 62 and the internal clock 64 are based on different clock frequencies and/or have different accuracies. To compensate for possible timing errors resulted from clock drifting, the communication control circuit 50 may be configured to re-sync the plurality of DL switching times 86(1)-86(N) with the plurality of DL periods 56(1)-56(N) on an on-going basis. In a non-limiting example, the power detection circuit 82 may be configured to detect a plurality of power rise times for the plurality of DL periods 56(1)-56(N) and synchronize the plurality of DL switching times 86(1)-86(N) with the plurality of power rise times, respectively. In this regard, synchronization is performed at each of the plurality of DL start times 70(1)-70(N). In another non-limiting example, the power detection circuit 82 may be configured to detect the power rise time and perform the synchronization periodically according to a predefined schedule.

By anchoring the plurality of DL switching times 86(1)-86(N) to the plurality of DL start times 70(1)-70(N) and generating the DL period indicator 90 at each of the plurality of DL switching times 86(1)-86(N), the processing circuit 80 ensures that the communication circuit 52 switches to the DL communication path 66 no later than each of the plurality of DL start times 70(1)-70(N). However, the plurality of UL switching times 88(1)-88(N) must be configured to accommodate for the processing and propagation delays associated with the communication control circuit 50 and the communication circuit 52. Furthermore, the communication control circuit 50 must not cause the communication circuit 52 to switch to the UL communication path 68 ahead of any of the plurality of DL end times 72(1)-72(N). In this regard, in a non-limiting example, the communication control circuit 50 makes sure that the plurality of UL switching times 88(1)-88(N) is no later than the plurality of UL start times 74(1)-74(N) and no earlier than the plurality of DL end times 72(1)-72(N), respectively. For example, the UL switching time 88(1) needs to be earlier than or equal to the UL start time 74(1) and later than or equal to the DL end time 72(1) (DL end time of immediate preceding DL period≤UL switching time≤UL start time of immediate succeeding UL period). In another non-limiting example, the communication control circuit 50 makes sure that the plurality of UL switching times 88(1)-88(N) is earlier than the plurality of UL start times 74(1)-74(N) and later than the plurality of DL end times 72(1)-72(N), respectively. For example, the UL switching time 88(1) needs to be earlier than the UL start time 74(1) and later than the DL end time 72(1) (DL end time of immediate preceding DL period <UL switching time <UL start time of immediate succeeding UL period). In another non-limiting example, the communication control circuit 50 may generate the DL period indicator 90 slightly ahead of each of the plurality of DL start times 70(1)-70(N) to accommodate processing and switching delays associated with the communication circuit 52 as long as the variation is reasonable. In another non-limiting example, the communication control circuit 50 may generate the UL period indicator 92 slightly ahead of each of the plurality of UL start times 74(1)-74(N) to accommodate processing and switching delays associated with the communication circuit 52 as long as the variation is reasonable. As such, the communication control circuit 50 can ensure that the communication circuit 52 operates within the boundaries of the plurality of DL periods 56(1)-56(N) and the plurality of UL periods 58(1)-58(N).

Hence, by anchoring the DL period indicator 90 to the plurality of DL start times 70(1)-70(N) detected based on power level sensing and providing the UL period indicator 92 ahead of the plurality of UL start times 74(1)-74(N), it is possible to communicate the TDD communication signal 54 synchronously in the plurality of DL periods 56(1)-56(N) and the plurality of UL periods 58(1)-58(N).

Figure 4:
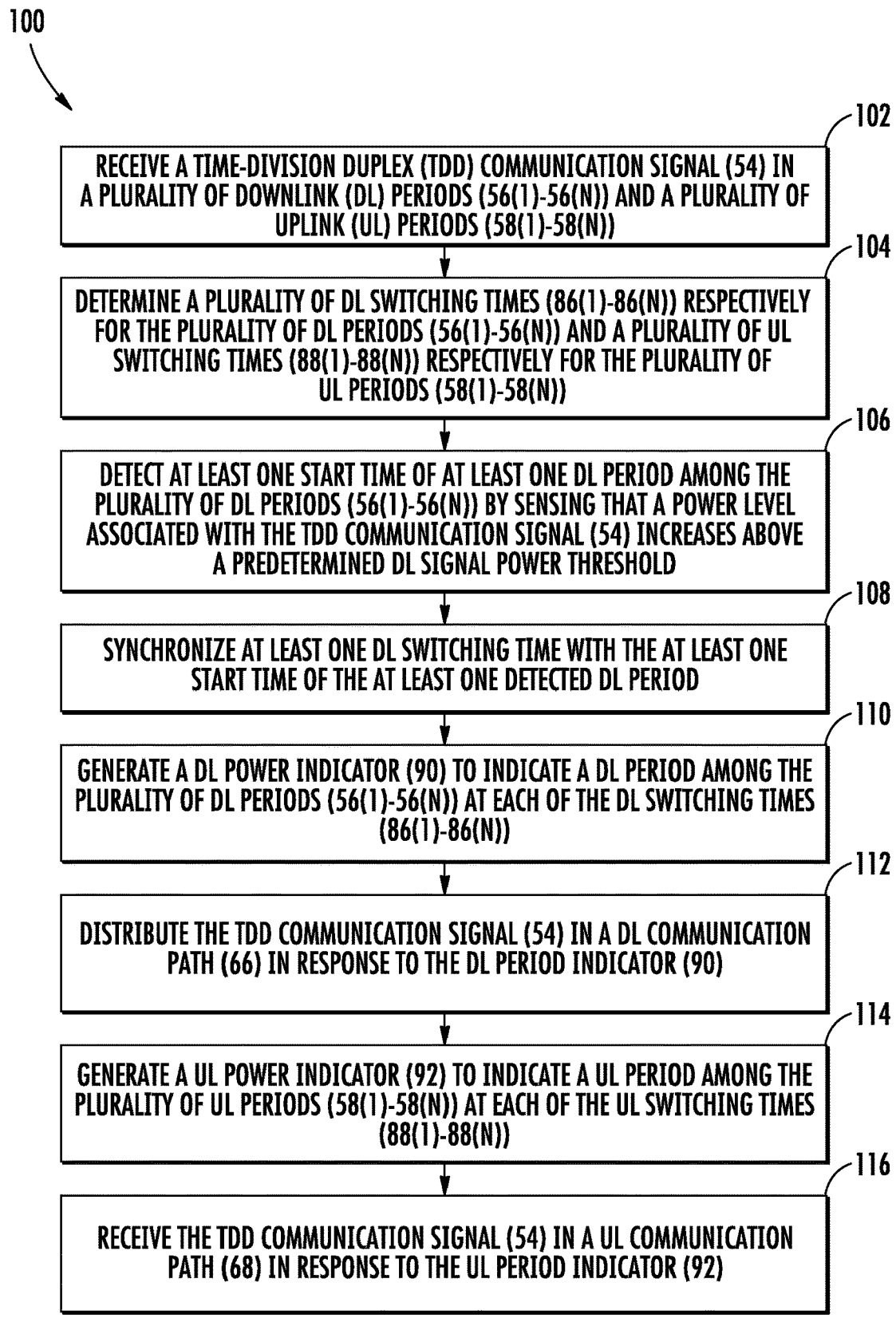
FIG. 4 is a flowchart of an exemplary control process for synchronously communicating the TDD communication signal of FIG. 3.

FIG. 4 is a flowchart of an exemplary control process 100 for synchronously communicating the TDD communication signal 54 of FIG. 3. Elements of FIG. 3 are referenced in connection with FIG. 4 and will not be re-described herein.

According to the control process 100, the communication control circuit 50 receives the TDD communication signal 54 in the plurality of DL periods 56(1)-56(N) and the plurality of UL periods 58(1)-58(N) (block 102). The TDD communication signal 54 is also received by the communication circuit 52 for communication in the DL communication path 66 and the UL communication path 68. The communication control circuit 50 then determines the plurality of DL switching times 86(1)-86(N) respectively for the plurality of DL periods 56(1)-56(N) and the plurality of UL switching times 88(1)-88(N) respectively for the plurality of UL periods 58(1)-58(N) (block 104). The communication control circuit 50 then detects at least one start time of at least one DL period among the plurality of DL periods 56(1)-56(N) by sensing that the power level associated with the TDD communication signal 54 increases above the predetermined DL signal power threshold (block 106). The communication control circuit 50 then synchronizes at least one DL switching time with the at least one start time of the at least one detected DL period (block 108). The communication control circuit 50 generates the DL period indicator 90 to indicate a DL period among the plurality of DL periods 56(1)-56(N) at each of the DL switching times 86(1)-86(N) (block 110). As previously discussed in FIG. 3, the communication control circuit 50 may generate the DL period indicator 90 (e.g., change polarity of the DL period indicator 90) slightly ahead of each of the plurality of DL start times 70(1)-70(N) to accommodate processing and switching delays associated with the communication circuit 52 as long as the variation is reasonable. The communication circuit 52 distributes the TDD communication signal 54 in the DL communication path 66 in response to the DL period indicator 90 (block 112). The communication control circuit 50 generates the UL period indicator 92 to indicate a UL period among the plurality of UL periods 58(1)-58(N) at each of the UL switching times 88(1)-88(N) (block 114). As previously discussed in FIG. 3, the plurality of UL switching times 88(1)-88(N) is no later than the plurality of UL start times 74(1)-74(N) and no earlier than the plurality of DL end times 72(1)-72(N), respectively. The communication circuit 52 receives the TDD communication signal 54 in the UL communication path 68 in response to the UL period indicator 92 (block 116).

Figure 5:
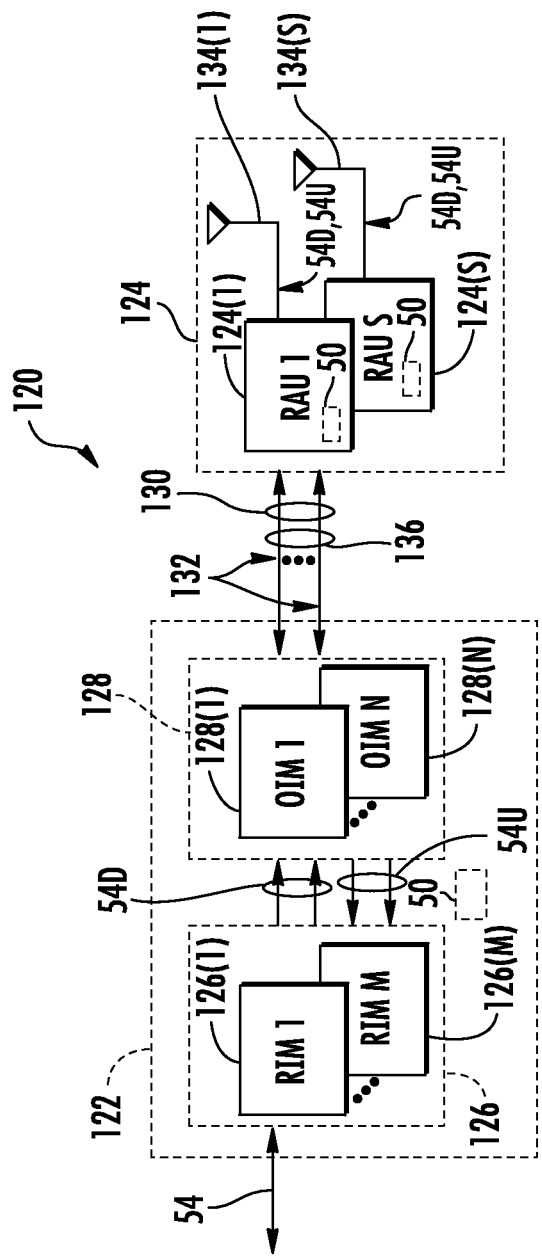
FIG. 5 is a schematic diagram of an exemplary DAS that may be configured to communicate the TDD communication signal of FIG. 3 by incorporating the communication control circuit of FIG. 3 into a central unit and/or a plurality of remote units in the DAS.

The communication circuit 52 of FIG. 3 typically exists in a central unit and a remote unit in a DAS. As such, the communication control circuit 50 may be provided in the central unit and/or the remote unit to generate and provide the DL period indicator 90 and the UL period indicator 92 to the communication circuit 52. In this regard, FIG. 5 is a schematic diagram of an exemplary DAS 120 that can be configured to communicate the TDD communication signal 54 of FIG. 3 by incorporating the communication control circuit 50 into a central unit 122 and/or a plurality of remote units 124(1)-124(S) in the DAS 120. Elements of FIG. 3 are referenced in connection with FIG. 5 and will not be re-described herein.

With reference to FIG. 5, the DAS 120 includes an optical fiber for distributing communications services. The DAS 120 is comprised of three (3) main components. One or more radio interfaces, provided in the form of radio interface modules (RIMs) 126(1)-126(M), are provided in the central unit 122, which may be a head-end equipment (HEE) for example, to receive and process the TDD communication signal 54 prior to optical conversion into optical communications signals. The RIMs 126(1)-126(M) provide both downlink and uplink interfaces. The notations "1-R" and "1-M" indicate that any number of the referenced component, 1-R and 1-M, respectively, may be provided. The central unit 122 is configured to accept the RIMs 126(1)-126(M) as modular components that can easily be installed and removed or replaced in the central unit 122. In a non-limiting example, the communication control circuit 50 may be provided in the central unit 122 and coupled to the RIMs 126(1)-126(M) to communicate the TDD communication signal 54. In another non-limiting example, each of the RIMs 126(1)-126(M) may be configured to function as the communication circuit 52. Accordingly, a communication control circuit 50 may be provided to for each of the RIMs 126(1)-126(M) to communicate the TDD communication signal 54.

Each RIM 126(1)-126(M) can be designed to support a particular type of radio source or range of radio sources (i.e., frequencies) to provide flexibility in configuring the central unit 122 and the DAS 120 to support the desired radio sources. For example, one RIM 126 may be configured to support the Personal Communication Services (PCS) radio band. Another RIM 126 may be configured to support a 700 MHz radio band. Another RIM 126 may be configured to support frequency-division duplex (FDD) communication. Another RIM 126 may be configured to support TDD communications. In this example, by inclusion of the RIMs 126, the central unit 122 could be configured to support and distribute communications signals on both PCS and LTE radio bands, as an example. The RIMs 126(1)-126(M) may be provided in the central unit 122 that support any frequency bands desired, including but not limited to the US Cellular band, Personal Communication Services (PCS) band, Advanced Wireless Services (AWS) band, 700 MHz band, LTE bands, Global System for Mobile communications (GSM) 900, GSM 1800, and Universal Mobile Telecommunications System (UMTS). The RIMs 126(1)-126(M) may also be provided in the central unit 122 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, Integrated Digital Enhanced Network (iDEN), and Cellular Digital Packet Data (CDPD).

The RIMs 126(1)-126(M) may be provided in the central unit 122 that support any frequencies desired, including but not limited to US Federal Communications Commission (FCC) and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

During the plurality of DL periods 56(1)-56(N) (not shown), the TDD communication signal 54 is provided as the DL communication signal 54D to a plurality of optical interfaces, provided in the form of optical interface modules (OIMs) 128(1)-128(N) (first optical element) in this non-limiting example, to convert the DL communication signal MD into DL optical communication signal 130. The notation "1-N" indicates that any number of the referenced component 1-N may be provided. The OIMs 128(1)-128(N) may be configured to provide one or more optical interface components (OICs) (not shown) that contain optical to electrical (O/E) and electrical to optical (E/O) converters (not shown), as will be described in more detail below. The OIMs 128(1)-128(N) support the radio bands that can be provided by the RIMs 126(1)-126(M), including the examples previously described above. Thus, in this embodiment, the OIMs 128(1)-128(N) may support a radio band range from 400 MHz to 2700 MHz, as an example.

The OIMs 128(1)-128(N) each include E/O converters to convert the DL communication signal 54D into the DL optical communication signal 130. The DL optical communication signal 130 is communicated over at least one optical fiber-based communications medium 132 to the plurality of remote units 124(1)-124(S) that may be provided as remote antenna units (RAUs) for example. The notation "1-S" indicates that any number of the referenced component 1-S may be provided. O/E converters provided in the plurality of remote units 124(1)-124(S) (second optical element) convert the DL optical communication signal 130 back into the DL communication signal 54D, which are provided to antennas 134(1)-134(S) in the remote units 124(1)-124(S) to client devices (not shown) in the reception range of the antennas 134(1)-134(S). In a non-limiting example, the communication control circuit 50 may be provided in each of the plurality of remote units 124(1)-124(S) to communicate the TDD communication signal 54, respectively.

E/O converters are also provided in the remote units 124(1)-124(S). During the plurality of UL periods 58(1)-58(N) (not shown), E/O converters convert the UL communication signal 54U received from the client devices through the antennas 134(1)-134(S) into UL optical communication signal 136 to be communicated over the at least one optical fiber-based communications medium 132 to the OIMs 128(1)-128(N). The OIMs 128(1)-128(N) include O/E converters that convert the UL optical communication signal 136 into the UL communication signal 54U which is processed by the RIMs 126(1)-126(M) and provided as the TDD communication signal 54 in the plurality of UL periods 58(1)-58(N). Note that the at least one optical fiber-based communications medium 132 connected to each of the plurality of remote units 124(1)-124(S) may be a common optical fiber-based communications medium, wherein for example, wave division multiplexing (WDM) may be employed to provide the DL optical communication signal 130 and the UL optical communication signal 136 on the same optical fiber-based communications medium.

Figure 6:
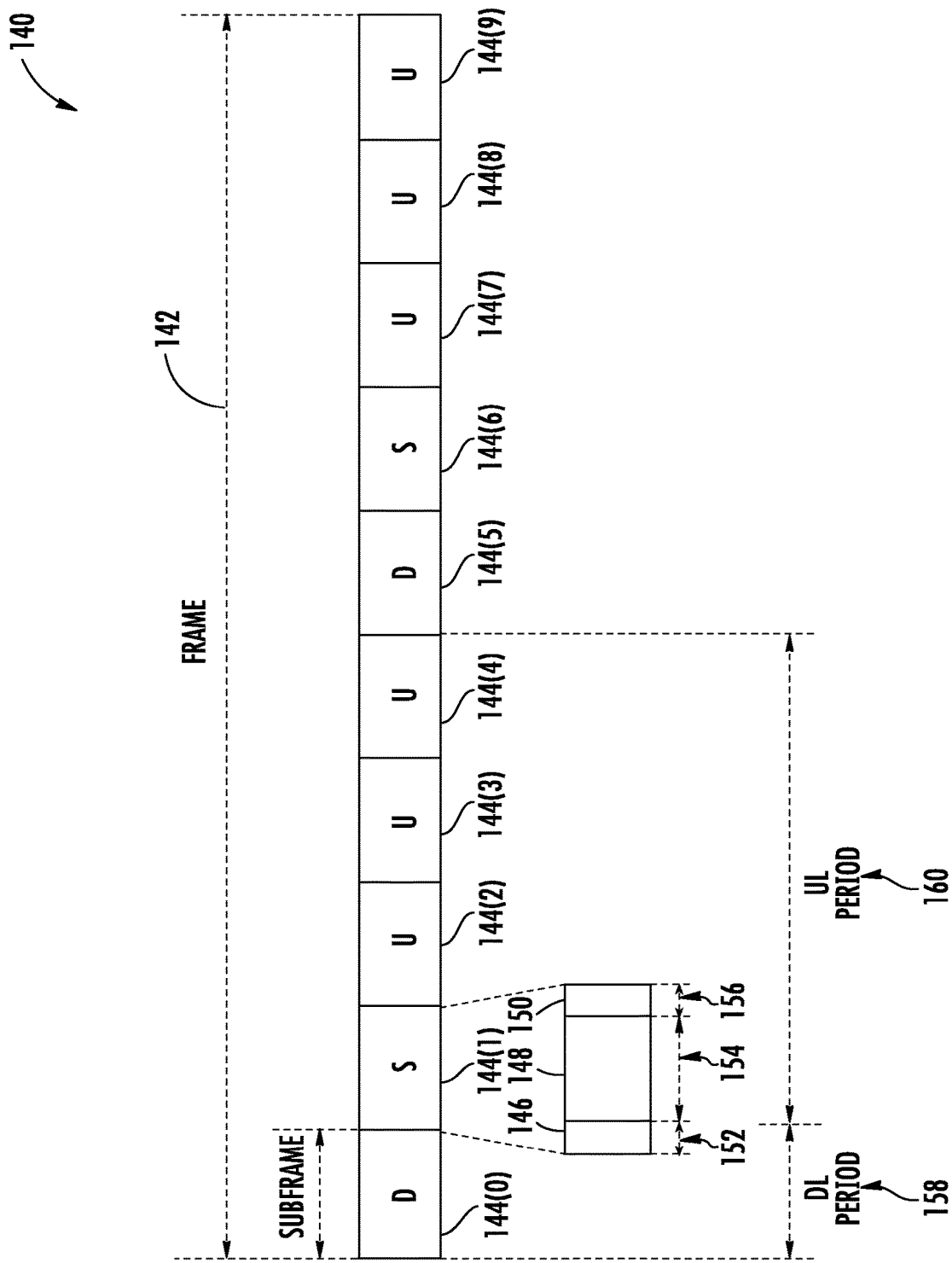
FIG. 6 is schematic diagram of an exemplary long-term evolution (LTE) frame format according to the third generation partnership project (3GPP) technical specification (TS) 36.211 (3GPP TS 36.211)

As previously discussed in FIG. 3, once the predefined TDD configuration is determined, the processing circuit 80 can calculate the plurality of DL switching times 86(1)-86(N) and the plurality of UL switching times 88(1)-88(N) based on the predefined TDD configuration. To help understand the calculations undertaken by the processing circuit 80 to determine the plurality of DL switching times 86(1)-86(N) and the plurality of UL switching times 88(1)-88(N), FIGS. 6-7C are discussed next. For the convenience of illustration and discussion, an LTE-specific TDD scheme is referenced hereinafter as a non-limiting example. As such, the processing circuit 80 calculates the plurality of DL switching times 86(1)-86(N) and the plurality of UL switching times 88(1)-88(N) for communicating an LTE TDD communication signal (not shown) based on an LTE TDD configuration defined by the LTE communication protocol. It should be understood that the calculations discussed herein for determining the plurality of DL switching times 86(1)-86(N) and the plurality of UL switching times 88(1)-88(N) are generally applicable to any TDD system (e.g., WiMAX, WCDMA, scheduled Wi-Fi, etc.).

In this regard, FIG. 6 is schematic diagram of an exemplary LTE frame format 140 according to the 3GPP technical specification (TS) 36.211 (3GPP TS 36.211).

With reference to FIG. 6, an LTE frame 142 comprises ten subframes 144(0)-144(9). The LTE frame 142 has frame duration of ten milliseconds (10 ms). As such, each of the ten subframes 144(0)-144(9) is one millisecond (1 ms) in duration. The LTE frame 142 can have three types of subframes denoted by "D," "U," and "S," respectively. The subframe 144(0) and the subframe 144(5) are DL subframes that are denoted as "D" and reserved for DL transmissions. The subframes 144(2)-144(4) and the subframes 144(7)-144(9) are UL subframes that are denoted as "U" and reserved for UL transmissions. The subframe 144(1) and the subframe 144(6), which are denoted as "S," are special subframes.

With continuing reference to FIG. 6, the special subframe 144(1) and the special subframe 144(6) each comprise a downlink pilot time slot (DwPTS) 146, a guard period (GP) 148, and an uplink pilot time slot (UpPTS) 150. The DwPTS 146, the GP 148, and the UpPTS 150 have a first duration 152, a second duration 154, and a third duration 156, respectively. The total of the first duration 152, the second duration 154, and the third duration 156 is equal to the 1 ms subframe duration. According to 3GPP TS 36.211, there may be nine different configurations for the first duration 152, the second duration 154, and the third duration 156, which are provided in Table 1 below.

TABLE 1

| Special subframe config-uration | Extended cyclic prefix length in orthogonal frequency division multiplexing (OFDM) symbols Total = 12 OFDM symbols Symbol = 83.4 microseconds (µs) | | | Normal cyclic prefix length in OFDM symbols Total = 14 OFDM symbols Symbol = 71.4 µs | | |
|---|---|---|---|---|---|---|
| | DwPTS | GP | UpPTS | DwPTS | GP | UpPTS |
| 0 | 3 | 8 | 1 | 3 | 10 | 1 |
| 1 | 8 | 3 | | 9 | 4 | |
| 2 | 9 | 2 | | 10 | 3 | |
| 3 | 10 | 1 | | 11 | 2 | |
| 4 | 3 | 7 | 2 | 12 | 1 | |
| 5 | 8 | 2 | | 3 | 9 | 2 |
| 6 | 9 | 1 | | 9 | 3 | |
| 7 | — | — | — | 10 | 2 | |
| 8 | | | | 11 | 1 | |

With continuing reference to FIG. 6, a special subframe is always inserted between a preceding DL subframe and a succeeding UL subframe to accommodate for propagation delays when switching from DL transmissions to UL transmissions. For example, the special subframe 144(1) is inserted between the preceding DL subframe 144(0) and the succeeding UL subframe 144(2). According to 3GPP TS 36.211, DL pilot tones and UL pilot tones may be transmitted during the DwPTS 146 and the UpPTS 150, respectively. In contrast, neither DL nor UL transmission could take place during the GP 148. In this regard, the DwPTS 146 can be included as part of a DL period while the GP 148 and UpPTS 150 may be included as part of a UL period. For example, as illustrated in FIG. 6, a DL period 158 in the LTE frame 142 comprises the DL subframe 144(0) and the DwPTS 146. A UL period 160 in the LTE frame 142 comprises the GP 148, the UpPTS 150, and the UL subframes 144(2)-144(4).

With continuing reference to FIG. 6, durations of the DL period 158 and the UL period 160 depend on the number of DL subframes and UL subframes that are included in the DL period 158 and the UL period 160, respectively. Table 2 below lists seven TDD configurations defined by 3GPP TS 36.211. Each of the seven TDD configurations may be used to determine the durations of the DL period 158 and the UL period 160. As such, if the TDD communication signal 54 of FIG. 3 is an LTE-TDD communication signal, the communication control circuit 50 can determine the plurality of DL switching times 86(1)-86(N) and the plurality of UL switching times 88(1)-88(N) based on a TDD configuration among the seven TDD configurations in Table 2.

TABLE 2

| TDD config- uration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Figure 7B:
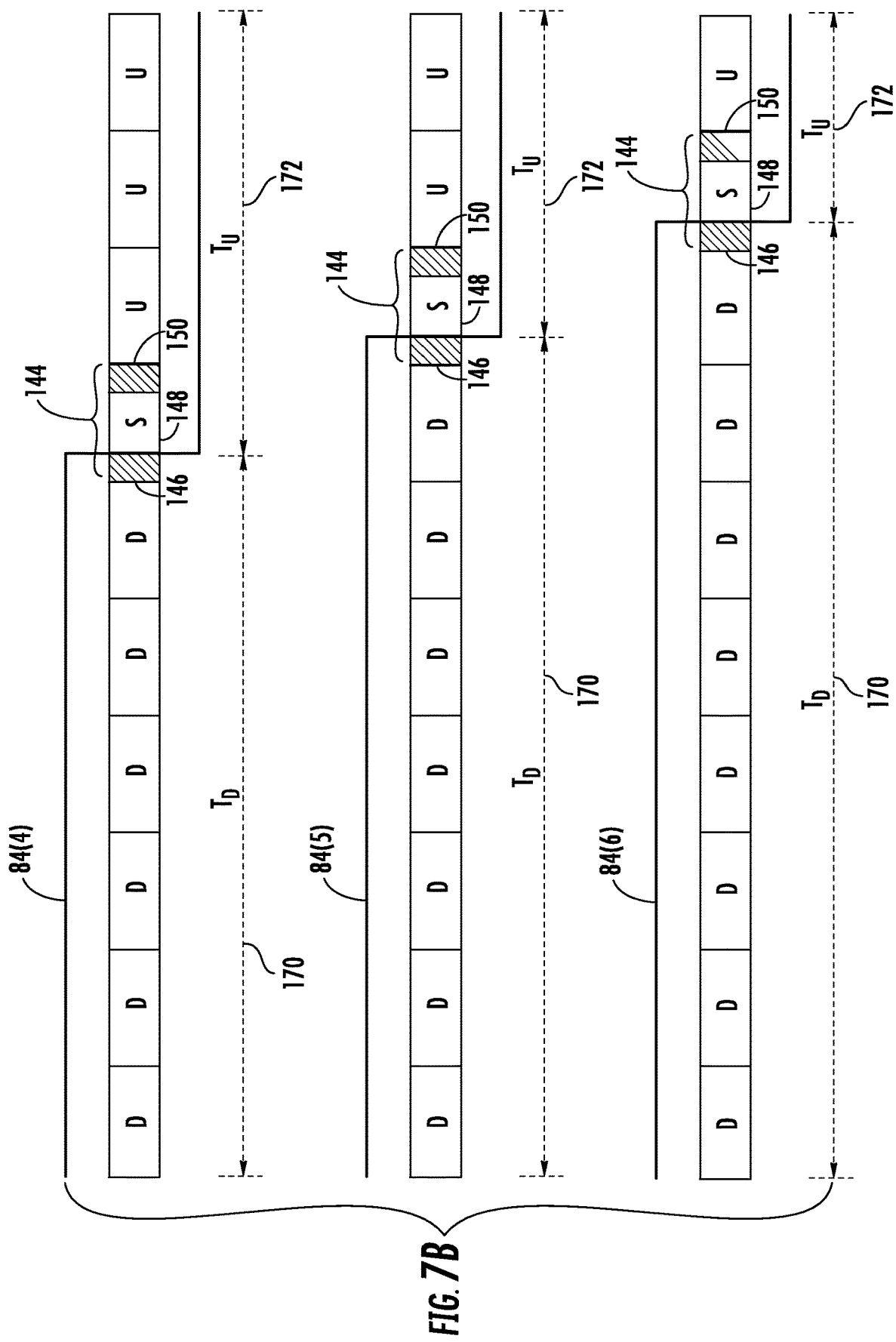
FIG. 7B is a schematic diagram providing an exemplary illustration of determining respective switching schedules based on 3GPP TS 36.211 uplink-downlink configurations three (3), four (4), and five (5)
Figure 7C:
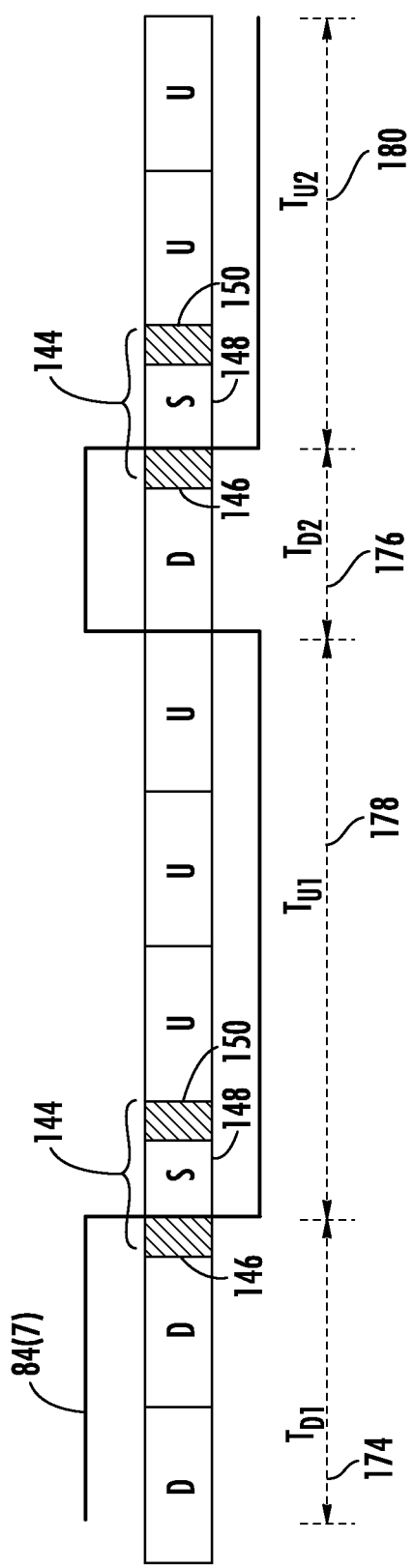
FIG. 7C is a schematic diagram providing an exemplary illustration of determining a respective switching schedule based on 3GPP TS 36.211 uplink-downlink configuration six (6)

To help understand how the switching schedule 84 of FIG. 3 can be determined based on each of the seven TDD configurations in Table 2, FIGS. 7A-7C are provided and discussed next. Elements of FIGS. 3 and 6 are referenced in connection with FIGS. 7A-7C and will not be re-described herein.

In this regard, FIG. 7A is a schematic diagram providing an exemplary illustration of determining switching schedules 84(1)-84(3) based on the 3GPP TS 36.211 TDD configurations zero (0), one (1), and two (2) in Table 2, respectively.

With reference to FIG. 7A, the switching schedules 84(1)-84(3) each comprise DL periods 170 and UL periods 172 configured to alternate repetitively every five milliseconds (5 ms). A special subframe 144, which may be any of the special subframes 144(1) and 144(6), is inserted between each of the DL periods 170 and each of the UL periods 172. The special subframe 144 comprises the DwPTS 146, the GP 148, and the UpPTS 150. According to the previous discussion in FIG. 6, each of the DL periods 170 includes the DwPTS 146. Each of the UL periods 172 includes the GP 148 and the UpPTS 150.

With continuing reference to FIG. 7A, each of the DL periods 170 has a DL period duration $T_D$ in milliseconds (ms), and each of the UL periods 172 has a UL period duration $T_U$ in ms. In a non-limiting example, the DL period duration $T_D$ can be calculated based on the equation (Eq. 1) below.

$$T_D = [2 \times (1 + IDX\_NUM) \times D_{Subframe}] + [D_{Symbol} \times N_{Symbol}] \quad \text{(Eq. 1)}$$

Wherein IDX_NUM represents a TDD configuration number, which is 0, 1, or 2, in Table 2. $D_{Subframe}$ represents the duration of an LTE DL subframe, which is one millisecond (1 ms) as defined in 3GPP TS 36.211. $D_{Symbol}$ represents the duration of an OFDM symbol. $N_{symbol}$ represents the number of OFDM symbols in the DwPTS 146 according to the special subframe configuration in Table 1.

For example, for the TDD configuration 0, the IDX_NUM equals 0, the $D_{Subframe}$ equals 1 ms, the $D_{Symbol}$ equals 1/14 ms for an OFDM symbol with normal cyclic prefix length, and the $N_{Symbol}$ equals three (3) according to special subframe configuration 0 in Table 1. As such, based on Eq. 1, the DL period duration $T_D$ may be calculated as:

$$T_D = [2 \times (1+0) \times 1] + [0.0714 \times 3] = 2.2142 \text{ ms}$$

According to Table 2, for TDD configurations 0, 1, and 2, the DL periods 170 and the UL periods 172 alternate every 5 ms. Therefore, the UL period duration $T_U$ for the TDD configurations 0, 1, and 2 may be calculated based on the equation (Eq. 2) below.

$$T_U = 5 - T_D \quad \text{(Eq. 2)}$$

For the TDD configuration 0, the UL period duration $T_U$ equals 5−2.2142=2.7858 ms according to Eq. 2.

FIG. 7B is a schematic diagram providing an exemplary illustration of determining switching schedules 84(4)-84(6) based on the 3GPP TS 36.211 TDD configurations three (3), four (4), and five (5) in Table 2, respectively.

With reference to FIG. 7B, the switching schedules 84(4)-84(6) each comprise DL periods 170 and UL periods 172 configured to alternate repetitively every ten milliseconds (10 ms). As such, in a non-limiting example, the DL period duration $T_D$ can be calculated based on the equation (Eq. 3) below.

$$T_D = [(3 + IDX\_NUM) \times D_{Subframe}] + [D_{Symbol} \times N_{Symbol}] \quad \text{(Eq. 3)}$$

Wherein IDX_NUM represents a TDD configuration number, which is 3, 4, or 5, in Table 2. $D_{Subframe}$ represents the duration of an LTE DL subframe, which is one millisecond (1 ms) as defined in 3GPP TS 36.211. $D_{Symbol}$ represents the duration of an OFDM symbol. $N_{Symbol}$ represents the number of OFDM symbols in the DwPTS 146 according to the special subframe configuration in Table 1.

For example, for the TDD configuration 3, the IDX_NUM equals 3, the $D_{Subframe}$ equals 1 ms, the $D_{Symbol}$ equals 1/14 ms for an OFDM symbol with normal cyclic prefix length, and the $N_{Symbol}$ equals three (3) according to special subframe configuration 0 in Table 1. As such, based on Eq. 3, the DL period duration $T_D$ may be calculated as:

$$T_D = [(3+3) \times 1] + [0.0714 \times 3] = 6.2142$$

According to Table 2, for TDD configurations 3, 4, and 5, the DL periods 170 and the UL periods 172 alternate every 10 ms. Therefore, the UL period duration $T_U$ for the TDD configurations 0, 1, and 2 may be calculated based on the equation (Eq. 4) below.

$$T_U = 10 - T_D \quad \text{(Eq. 4)}$$

For the TDD configuration 3, the UL period duration $T_U$ equals 10−6.2142=3.7858 ms according to Eq. 4.

FIG. 7C is a schematic diagram providing an exemplary illustration of determining switching schedule 84(7) based on the 3GPP TS 36.211 TDD configuration six (6).

With reference to FIG. 7C, the switching schedule 84(7) comprises a first DL period 174, a second DL period 176, a first UL period 178, and a second UL period 180 that repeat every ten milliseconds (10 ms). The first DL period 174 has a first DL period duration $T_{D1}$, and the second DL period 176 has a second DL period duration $T_{D2}$. The first UL period 178 has a first UL period duration $T_{U1}$ and the second UL period 180 has a second UL period duration $T_{U2}$.

In a non-limiting example, the first DL period duration $T_{D1}$ and the second DL period duration $T_{D2}$ can be respectively calculated based on the equations (Eq. 5 and Eq. 6) below.

$$T_{D1} = [2 \times D_{Subframe}] + [D_{Symbol} \times N_{Symbol}] \quad \text{(Eq. 5)}$$

$$T_{D2} = D_{Subframe} + [D_{Symbol} \times N_{Symbol}] \quad \text{(Eq. 6)}$$

Wherein $D_{Subframe}$ represents the duration of an LTE DL subframe, which is one millisecond (1 ms) as defined in 3GPP TS 36.211. $D_{Symbol}$ represents the duration of an OFDM symbol. $N_{Symbol}$ represents the number of OFDM symbols in the DwPTS 146 according to the special subframe configuration in Table 1.

For example, for the TDD configuration 6, the $D_{Subframe}$ equals 1 ms, the $D_{Symbol}$ equals 1/14 ms for an OFDM symbol with normal cyclic prefix length, and the $N_{Symbol}$ equals three (3) according to special subframe configuration 0 in Table 1. As such, based on Eq. 5, the DL period duration $T_D$ may be calculated as:

$$T_{D1}=[2\times1]+[0.0714\times3]=2.2142 \text{ ms}$$

$$T_{D2}=1+[0.0714\times3]=1.2142 \text{ ms}$$

The first UL period duration $T_{U1}$ and the second UL period duration $T_{U2}$ can be respectively calculated based on the equations (Eq. 7 and Eq. 8) below.

$$T_{U1}=4-T_{D2} \quad\quad\quad\quad (\text{Eq. 7})$$

$$T_{U2}=6-T_{D1} \quad\quad\quad\quad (\text{Eq. 8})$$

For the TDD configuration 6, the first UL period duration $T_{U1}$ equals 4−1.2142=2.7858 ms according to Eq. 7. The second UL period duration $T_{U2}$ equals 6−2.2142=3.7858 ms according to Eq. 8.

Figure 8:
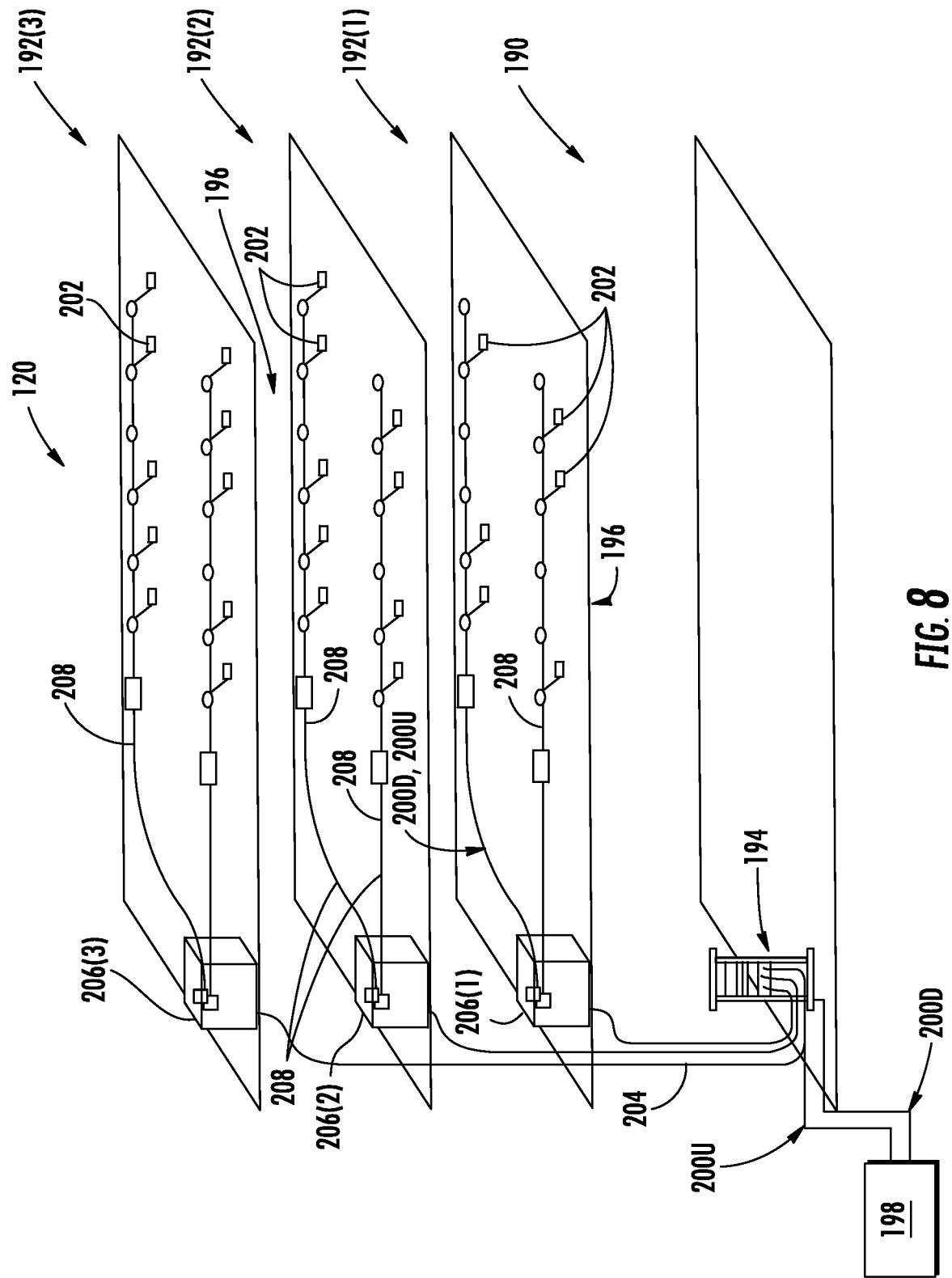
FIG. 8 is a partial schematic cut-away diagram of an exemplary building infrastructure in which the TDD-based DAS of FIG. 5 can be employed.

The communication control circuit 50 of FIG. 3, which may be provided in the DAS 120 of FIG. 5, may be provided in an indoor environment, as illustrated in FIG. 8. FIG. 8 is a partial schematic cut-away diagram of an exemplary building infrastructure 190 in which the DAS 120 of FIG. 5 can be employed. The building infrastructure 190 in this embodiment includes a first (ground) floor 192(1), a second floor 192(2), and a third floor 192(3). The floors 192(1)-192(3) are serviced by a central unit 194 to provide antenna coverage areas 196 in the building infrastructure 190. The central unit 194 is communicatively coupled to a base station 198 to receive downlink communications signals 200D from the base station 198. The central unit 194 is communicatively coupled to a plurality of remote units 202 to distribute the downlink communications signals 200D to the plurality of remote units 202 and to receive uplink communications signals 200U from the plurality of remote units 202, as previously discussed above. The downlink communications signals 200D and the uplink communications signals 200U communicated between the central unit 194 and the plurality of remote units 202 are carried over a riser cable 204. The riser cable 204 may be routed through interconnect units (ICUs) 206(1)-206(3) dedicated to each of the floors 192(1)-192(3) that route the downlink communications signals 200D and the uplink communications signals 200U to the plurality of remote units 202 and also provide power to the plurality of remote units 202 via array cables 208.

Figure 9:
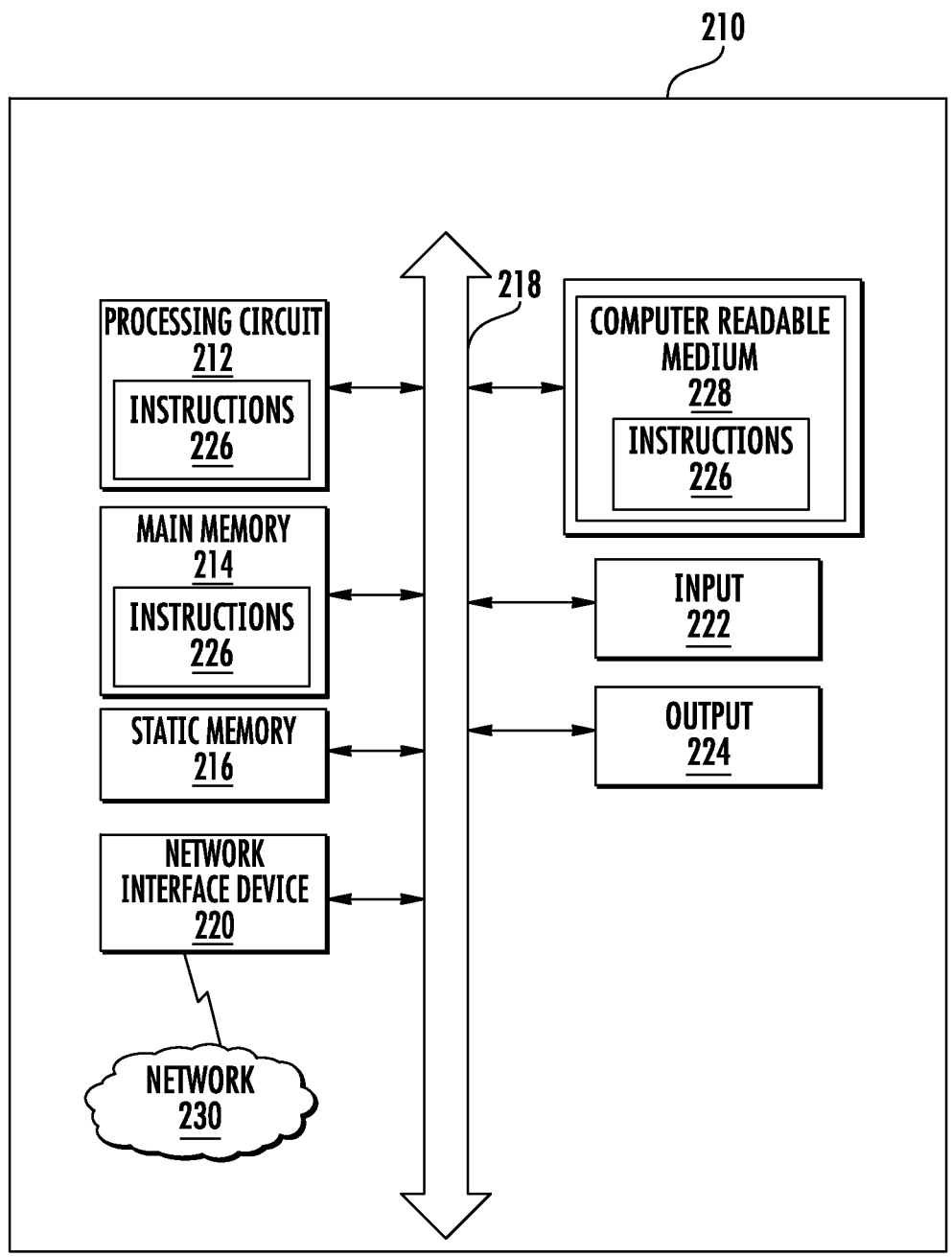
FIG. 9 is a schematic diagram of a generalized representation of an exemplary controller that can be included in the communication control circuit of FIG. 3 to enable the communication circuit of FIG. 3 to synchronously communicate the TDD communication signal, wherein an exemplary computer system is adapted to execute instructions from an exemplary computer-readable medium.

FIG. 9 is a schematic diagram illustrating additional details of an exemplary computer system 210 that could be employed in the controllers discussed above, including, but not limited to, the communication control circuit 50 of FIG. 3. As discussed above, the communication control circuit 50 is configured to calculate the plurality of DL switching times 86(1)-86(N) and the plurality of UL switching times 88(1)-88(N) based on the predefined TDD configuration of the predetermined TDD communications protocol. In this regard, the computer system 210 is adapted to execute instructions from an exemplary computer-readable medium to perform these and/or any of the functions or processing described herein.

With reference to FIG. 9, the computer system 210 may include a set of instructions that may be executed to calculate the plurality of DL switching times 86(1)-86(N) and the plurality of UL switching times 88(1)-88(N) based on the predefined TDD configuration of the predetermined TDD communications protocol. The computer system 210 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 210 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 210 in this embodiment includes a processing circuit ("processor 212"), a main memory 214 (e.g., read-only memory (ROM), flash memory, dynamic random access memory (DRAM), such as synchronous DRAM (SDRAM), etc.), and a static memory 216 (e.g., flash memory, static random access memory (SRAM), etc.), which may communicate with each other via a data bus 218. Alternatively, the processor 212 may be connected to the main memory 214 and/or the static memory 216 directly or via some other connectivity bus or connection. The processor 212 may be provided in a processing circuit like the processing circuit 80 of FIG. 3. The main memory 214 and the static memory 216 may be any type of memory.

The processor 212 may be a microprocessor, central processing unit, or the like. More particularly, the processor 212 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 212 is configured to execute processing logic in instructions for performing the operations and steps discussed herein.

The computer system 210 may further include a network interface device 220. The computer system 210 also may or may not include an input 222, configured to receive input and selections to be communicated to the computer system 210 when executing instructions. The computer system 210 also may or may not include an output 224, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 210 may or may not include a data storage device that includes instructions 226 stored in a computer-readable medium 228. The instructions 226 may also reside, completely or at least partially, within the main memory 214 and/or within the processor 212 during execution thereof by the computer system 210, the main memory 214 and the processor 212 also constituting the computer-readable medium 228. The instructions 226 may further be transmitted or received over a network 230 via the network interface device 220.

While the computer-readable medium 228 is shown in an exemplary embodiment to be a single medium, the term "computer-readable medium" should be taken to include a single medium or multiple mediums (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical mediums, and magnetic mediums.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed antenna system (DAS) configured to support time-division duplex (TDD) communication, the DAS comprising:
    a central unit communicatively coupled to a plurality of remote units over at least one communications medium to communicate a TDD communication signal in a plurality of downlink (DL) periods and a plurality of uplink (UL) periods configured according to a predefined TDD configuration of a predetermined TDD communications protocol;
    the central unit comprises at least one communication circuit configured to:
        transmit the TDD communication signal in a DL communication path of the central unit to the plurality of remote units in response to a DL period indicator indicating a DL period among the plurality of DL periods; and
        receive the TDD communication signal in a UL communication path of the central unit from the plurality of remote units in response to a UL period indicator indicating a UL period among the plurality of UL periods; and
    a communication control circuit configured to:
        retrieve information preprogrammed in the communication control circuit and indicative of the predefined TDD configuration;
        determine a plurality of DL switching times respectively for the plurality of DL periods and a plurality of UL switching times respectively for the plurality of UL periods based on the predefined TDD configuration;
        detect a respective start time of at least one DL period among the plurality of DL periods by sensing that a power level associated with the TDD communication signal increases above a predetermined DL signal power threshold;
        synchronize at least one DL switching time among the plurality of DL switching times with the respective start time of the at least one DL period;
        generate the DL period indicator to indicate the DL period among the plurality of DL periods at each of the plurality of DL switching times; and
        generate the UL period indicator to indicate the UL period among the plurality of UL periods at each of the plurality of UL switching times.

2. The DAS of claim 1, wherein each of the plurality of remote units comprises the at least one communication circuit configured to:
    receive the TDD communication signal from the DL communication path of the central unit and distribute the TDD communication signal to client devices in a DL communication path of the remote unit in response to the DL period indicator indicating the DL period among the plurality of DL periods; and
    receive the TDD communication signal from the client devices in a UL communication path of the remote unit and provide the TDD communication signal to the UL communication path of the central unit.

3. The DAS of claim 2, wherein:
    the at least one communications medium is at least one optical fiber-based communications medium;
    the central unit further comprises a first optical element coupled to the at least one communication circuit in the central unit, the first optical element is configured to:
        receive the TDD communication signal from the at least one communication circuit;
        convert the TDD communication signal to a DL optical communication signal for communication to the plurality of remote units over the at least one optical fiber-based communications medium;
        receive a UL optical communication signal from the plurality of remote units over the at least one optical fiber-based communications medium; and
        convert the UL optical communication signal into the TDD communication signal and provide the TDD communication signal to the at least one communication circuit; and
    each of the plurality of remote units further comprises a second optical element coupled to the at least one communication circuit in the remote unit, the second optical element configured to:
        receive the DL optical communication signal from the central unit over the at least one optical fiber-based communications medium;
        convert the DL optical communication signal to the TDD communication signal and provide the TDD communication signal to the at least one communication circuit;
        receive the TDD communication signal from the at least one communication circuit; and
        convert the TDD communication signal into the UL optical communication signal for communication to the central unit over the at least one optical fiber-based communications medium.

4. The DAS of claim 1, wherein the communication control circuit comprises:
a power detection circuit configured to:
measure continuously the power level associated with the TDD communication signal;
detect at least one power rise time at which the measured power level increases above the predetermined DL signal power threshold; and
provide the at least one power rise time to a processing circuit; and
the processing circuit configured to:
determine the plurality of DL switching times and the plurality of UL switching times based on the predefined TDD configuration;
synchronize at least one DL switching time among the plurality of DL switching times with the at least one power rise time received from the power detection circuit;
generate the DL period indicator to indicate the DL period among the plurality of DL periods at each of the plurality of DL switching times; and
generate the UL period indicator to indicate the UL period among the plurality of UL periods at each of the plurality of UL switching times.

5. The DAS of claim 4, wherein the power detection circuit is configured to detect the at least one power rise time at which the measured power level increases above the predetermined DL signal power threshold after a no-DL-signal period in which the measured power level is below the predetermined DL signal power threshold.

6. The DAS of claim 4, wherein:
the power detection circuit is further configured to detect a plurality of power rise times for the plurality of DL periods, respectively; and
the processing circuit is further configured to synchronize the plurality of DL switching times with the plurality of power rise times, respectively.

7. The DAS of claim 1, wherein:
the plurality of DL periods is configured to begin at a plurality of DL start times and end at a plurality of DL end times, respectively;
the plurality of UL periods is configured to begin at a plurality of UL start times and end at a plurality of UL end times, respectively;
the plurality of DL switching times is concurrent to the plurality of DL start times, respectively; and
the plurality of UL switching times is no later than the plurality of UL start times and no earlier than the plurality of DL end times, respectively.

8. The DAS of claim 7, wherein the plurality of UL switching times is earlier than the plurality of UL start times and later than the plurality of DL end times, respectively.

9. The DAS of claim 1, wherein:
the predetermined TDD communications protocol is a long-term evolution (LTE) communications protocol and the TDD communication signal is a LTE TDD communication signal;
a special subframe disposed between a preceding DL period among the plurality of DL periods and a succeeding UL period among the plurality of UL periods, comprising:
a downlink pilot time slot (DwPTS);
a guard period (GP); and
an uplink pilot time slot (UpPTS);
the preceding DL period comprises the DwPTS; and
the succeeding UL period comprises the GP and the UpPTS.

10. A method for communicating time-division duplex (TDD) communication signals in a distributed antenna system (DAS), comprising:
receiving a TDD communication signal in a plurality of downlink (DL) periods and a plurality of uplink (UL) periods configured according to a predefined TDD configuration of a predetermined TDD communications protocol;
retrieving preprogrammed information stored in a communication control circuit indicative of the predefined TDD configuration;
determining a plurality of DL switching times respectively for the plurality of DL periods and a plurality of UL switching times respectively for the plurality of UL periods based on the predefined TDD configuration;
detecting a respective start time of at least one DL period among the plurality of DL periods by sensing that a power level associated with the TDD communication signal increases above a predetermined DL signal power threshold;
synchronizing at least one DL switching time among the plurality of DL switching times with the respective start time of the at least one DL period;
generating a DL period indicator to indicate a DL period among the plurality of DL periods at each of the plurality of DL switching times;
distributing the TDD communication signal in a DL communication path in response to the DL period indicator;
generating a UL period indicator to indicate a UL period among the plurality of UL periods at each of the plurality of UL switching times; and
receiving the TDD communication signal in a UL communication path in response to the UL period indicator indicating the UL period among the plurality of UL periods.

11. The method of claim 10 further comprising:
measuring continuously the power level associated with the TDD communication signal; and
detecting at least one power rise time at which the measured power level increases above the predetermined DL signal power threshold.

12. The method of claim 11 further comprising detecting the at least one power rise time at which the measured power level increases above the predetermined DL signal power threshold after a no-DL-signal period in which the measured power level is below the predetermined DL signal power threshold.

13. The method of claim 11 further comprising:
detecting a plurality of power rise times for the plurality of DL periods, respectively; and
synchronizing the plurality of DL switching times with the plurality of power rise times, respectively.

14. The method of claim 10 further comprising:
converting the TDD communication signal received in the DL communication path into a DL optical communication signal for communication over at least one optical fiber-based communications medium; and
converting a UL optical communication signal into the TDD communication signal and providing the TDD communication signal to the UL communication path.

15. A central unit in a distributed antenna system (DAS), comprising:
at least one communication circuit configured to:
receive a TDD communication signal from a communication signal source in a plurality of downlink (DL) periods and a plurality of uplink (UL) periods configured according to a predefined TDD configuration of a predetermined TDD communications protocol;

transmit the TDD communication signal in a DL communication path of the central unit in response to a DL period indicator indicating a DL period among the plurality of DL periods; and receive the TDD communication signal in a UL communication path of the central unit in response to a UL period indicator indicating a UL period among the plurality of UL periods; and a communication control circuit configured to:

retrieve information preprogrammed in the communication control circuit and indicative of the predefined TDD configuration;

determine a plurality of DL switching times respectively for the plurality of DL periods and a plurality of UL switching times respectively for the plurality of UL periods based on the predefined TDD configuration;

detect a respective start time of at least one DL period among the plurality of DL periods by sensing that a power level associated with the TDD communication signal increases above a predetermined DL signal power threshold;

synchronize at least one DL switching time among the plurality of DL switching times with the respective start time of the at least one DL period;

generate the DL period indicator to indicate the DL period among the plurality of DL periods at each of the plurality of DL switching times; and generate the UL period indicator to indicate the UL period among the plurality of UL periods at each of the plurality of UL switching times.

16. The central unit of claim 15, wherein the communication control circuit comprises:

a power detection circuit configured to:

measure continuously the power level associated with the TDD communication signal;

detect at least one power rise time at which the measured power level increases above the predetermined DL signal power threshold; and provide the at least one power rise time to a processing circuit; and the processing circuit configured to:

determine the plurality of DL switching times and the plurality of UL switching times based on the predefined TDD configuration;

synchronize at least one DL switching time among the plurality of DL switching times with the at least one power rise time received from the power detection circuit;

generate the DL period indicator to indicate the DL period among the plurality of DL periods at each of the plurality of DL switching times; and generate the UL period indicator to indicate the UL period among the plurality of UL periods at each of the plurality of UL switching times.

17. The central unit of claim 16, wherein the power detection circuit is configured to detect the at least one power rise time at which the measured power level increases above the predetermined DL signal power threshold after a no-DL-signal period in which the measured power level is below the predetermined DL signal power threshold.

18. The central unit of claim 16, wherein:

the power detection circuit is further configured to detect a plurality of power rise times for the plurality of DL periods, respectively; and the processing circuit is further configured to synchronize the plurality of DL switching times with the plurality of power rise times, respectively.

19. The central unit of claim 15, wherein:

the plurality of DL periods is configured to begin at a plurality of DL start times and end at a plurality of DL end times, respectively;

the plurality of UL periods is configured to begin at a plurality of UL start times and end at a plurality of UL end times, respectively;

the plurality of DL switching times is concurrent to the plurality of DL start times, respectively; and the plurality of UL switching times is no later than the plurality of UL start times and no earlier than the plurality of DL end times, respectively.

20. The central unit of claim 19, wherein the plurality of UL switching times is earlier than the plurality of UL start times and later than the plurality of DL end times, respectively.

21. The central unit of claim 15, wherein:

the predetermined TDD communications protocol is a long-term evolution (LTE) communications protocol and the TDD communication signal is a LTE TDD communication signal;

a special subframe disposed between a preceding DL period among the plurality of DL periods and a succeeding UL period among the plurality of UL periods, comprising:

a downlink pilot time slot (DwPTS);

a guard period (GP); and an uplink pilot time slot (UpPTS);

the preceding DL period comprises the DwPTS; and the succeeding UL period comprises the GP and the UpPTS.

22. A remote unit in a distributed antenna system (DAS), comprising:

a communication circuit configured to:

receive a time-division duplex (TDD) communication signal from a central unit in a plurality of downlink (DL) periods and a plurality of uplink (UL) periods configured according to a predefined TDD configuration of a predetermined TDD communications protocol;

transmit the TDD communication signal in a DL communication path of the remote unit in response to a DL period indicator indicating a DL period among the plurality of DL periods; and receive the TDD communication signal in a UL communication path of the remote unit in response to a UL period indicator indicating a UL period among the plurality of UL periods; and a communication control circuit configured to:

retrieve information preprogrammed in the communication control circuit and indicative of the predefined TDD configuration;

determine a plurality of DL switching times respectively for the plurality of DL periods and a plurality of UL switching times respectively for the plurality of UL periods based on the predefined TDD configuration;

detect a respective start time of at least one DL period among the plurality of DL periods by sensing that a power level associated with the TDD communication signal increases above a predetermined DL signal power threshold;

synchronize at least one DL switching time among the plurality of DL switching times with the respective start time of the at least one DL period;

generate the DL period indicator to indicate the DL period among the plurality of DL periods at each of the plurality of DL switching times; and generate the UL period indicator to indicate the UL period among the plurality of UL periods at each of the plurality of UL switching times.

23. The remote unit of claim 22, wherein the communication control circuit comprises:

a power detection circuit configured to:
  measure continuously the power level associated with the TDD communication signal;
  detect at least one power rise time at which the measured power level increases above the predetermined DL signal power threshold; and
  provide the at least one power rise time to a processing circuit; and the processing circuit configured to:
  determine the plurality of DL switching times and the plurality of UL switching times based on the predefined TDD configuration;
  synchronize at least one DL switching time among the plurality of DL switching times with the at least one power rise time received from the power detection circuit;
  generate the DL period indicator to indicate the DL period among the plurality of DL periods at each of the plurality of DL switching times; and
  generate the UL period indicator to indicate the UL period among the plurality of UL periods at each of the plurality of UL switching times.

24. The remote unit of claim 23, wherein the power detection circuit is configured to detect the at least one power rise time at which the measured power level increases above the predetermined DL signal power threshold after a no-DL-signal period in which the measured power level is below the predetermined DL signal power threshold.

25. The remote unit of claim 23, wherein:
the power detection circuit is further configured to detect a plurality of power rise times for the plurality of DL periods, respectively; and
the processing circuit is further configured to synchronize the plurality of DL switching times with the plurality of power rise times, respectively.

26. The remote unit of claim 22, wherein:
the plurality of DL periods is configured to begin at a plurality of DL start times and end at a plurality of DL end times, respectively;
the plurality of UL periods is configured to begin at a plurality of UL start times and end at a plurality of UL end times, respectively;
the plurality of DL switching times is concurrent to the plurality of DL start times, respectively; and
the plurality of UL switching times is no later than the plurality of UL start times and no earlier than the plurality of DL end times, respectively.

27. The remote unit of claim 22, wherein:
the predetermined TDD communications protocol is a long-term evolution (LTE) communications protocol and the TDD communication signal is a LTE TDD communication signal;
a special subframe disposed between a preceding DL period among the plurality of DL periods and a succeeding UL period among the plurality of UL periods, comprising:
  a downlink pilot time slot (DwPTS);
  a guard period (GP); and
  an uplink pilot time slot (UpPTS);
the preceding DL period comprises the DwPTS; and
the succeeding UL period comprises the GP and the UpPTS.

* * * * *